US007972093B2

(12) United States Patent
Li

(10) Patent No.: US 7,972,093 B2
(45) Date of Patent: Jul. 5, 2011

(54) ONE-WAY CLUTCH AND A CLAMPING STRUCTURE FOR A HANDLED TOOL USING THE SAME

(75) Inventor: Guijie Li, Weihei (CN)

(73) Assignee: Shandong Weida Machinery Co., Ltd., Wendeng, Shandong Province (CN)

( * ) Notice: Subject to any disclaimer, the term of this patent is extended or adjusted under 35 U.S.C. 154(b) by 1315 days.

(21) Appl. No.: 11/528,910

(22) Filed: Sep. 28, 2006

(65) Prior Publication Data

US 2007/0074948 A1   Apr. 5, 2007

(30) Foreign Application Priority Data

Sep. 28, 2005   (CN) .......................... 2005 1 0105174

(51) Int. Cl.
 *B23B 31/16* (2006.01)
(52) U.S. Cl. .......... 408/124; 408/240; 279/62; 279/140; 279/902
(58) Field of Classification Search .................. 408/124, 408/240; 279/60–65, 140, 902; *B23B 31/16*
See application file for complete search history.

(56) References Cited

U.S. PATENT DOCUMENTS

| | | | | | |
|---|---|---|---|---|---|
| 5,458,345 A | * | 10/1995 | Amyot | ............................. | 279/62 |
| 5,741,016 A | * | 4/1998 | Barton et al. | .................... | 279/62 |
| 5,765,839 A | * | 6/1998 | Rohm | ............................. | 279/62 |
| 5,829,761 A | * | 11/1998 | Rohm | ............................. | 279/62 |
| 6,341,783 B1 | * | 1/2002 | Rohm | ............................. | 279/62 |
| 6,517,088 B1 | * | 2/2003 | Rohm | ............................. | 279/62 |
| 6,550,785 B2 | * | 4/2003 | Rohm | ............................. | 279/62 |
| 6,581,942 B2 | * | 6/2003 | Rohm | ............................. | 279/62 |
| 6,659,474 B2 | * | 12/2003 | Sakamaki et al. | .............. | 279/62 |
| 6,824,141 B1 | * | 11/2004 | Sakamaki et al. | .............. | 279/62 |
| 6,843,485 B2 | * | 1/2005 | Sakamaki et al. | .............. | 279/62 |
| 6,902,171 B2 | * | 6/2005 | Sakamaki et al. | .............. | 279/62 |
| 6,959,931 B2 | * | 11/2005 | Sakamaki et al. | .............. | 279/62 |
| 7,125,021 B2 | * | 10/2006 | Tan | ................................. | 279/62 |
| 7,156,402 B2 | * | 1/2007 | Mack | ............................. | 279/60 |
| 7,178,216 B2 | * | 2/2007 | Sakamaki et al. | .............. | 29/436 |
| 7,258,351 B2 | * | 8/2007 | Hoffmann et al. | .............. | 279/60 |
| 7,389,993 B2 | * | 6/2008 | Rohm et al. | ..................... | 279/62 |
| 7,497,444 B2 | * | 3/2009 | Sakamaki et al. | .............. | 279/62 |
| 7,581,907 B2 | * | 9/2009 | Zhou et al. | ..................... | 408/240 |
| 2005/0230926 A1 | * | 10/2005 | Sakamaki et al. | .............. | 279/62 |
| 2006/0091619 A1 | * | 5/2006 | Tan | ................................. | 279/62 |
| 2009/0058019 A1 | * | 3/2009 | Mack | ............................. | 279/114 |
| 2010/0127464 A1 | * | 5/2010 | Mack | ............................. | 279/62 |

FOREIGN PATENT DOCUMENTS

EP   710518 A2 *  5/1996

* cited by examiner

*Primary Examiner* — Eric A Gates
(74) *Attorney, Agent, or Firm* — Hoffmann & Baron, LLP

(57) ABSTRACT

The present invention discloses a one-way clutch capable of eliminating the phenomenon of "teeth scraping", comprising: ratchet member, pawl seat, pawl member, control outer sleeve and control member provided with control portion, wherein at least one of the control portion or the pawl member has a first slope capable of being in contact with the other one of the control portion or the pawl member and said pawl member exerts a force towards the second direction on the control portion.

36 Claims, 13 Drawing Sheets

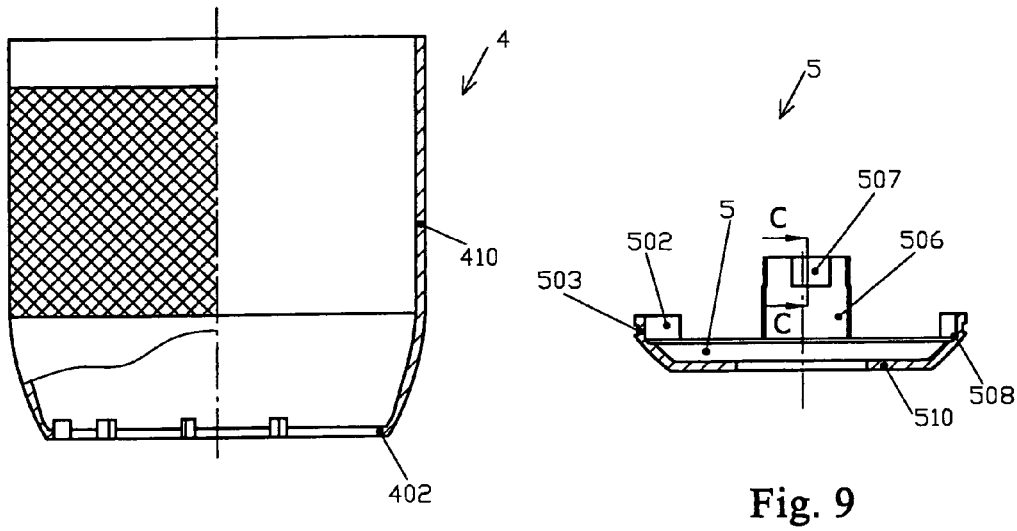
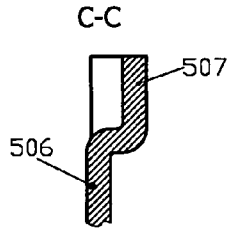
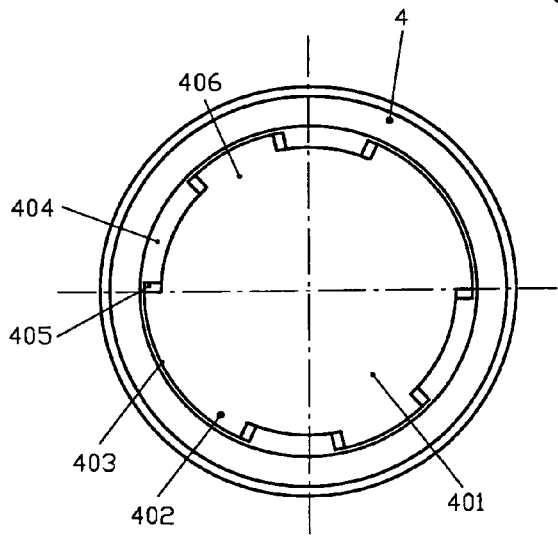
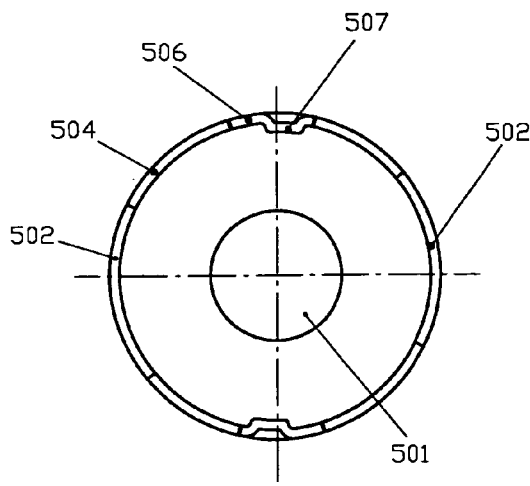

US 7,972,093 B2

ONE-WAY CLUTCH AND A CLAMPING STRUCTURE FOR A HANDLED TOOL USING THE SAME

TECHNICAL FIELD

The present invention relates to a one-way clutch, particularly to that capable of disengaging a pawl from ratchets sufficiently so as to prevent from teeth scraping resulted from the sliding of pawl along the crest (top) of the ratchets. The present invention further relates to a handled tool using the one-way clutch.

BACKGROUND ART

The existing clamping structure for a handled tool, e.g., drill chuck, generally consists of body, jaws, nut, bearing, anti-loose device and outer sleeve, wherein the body is connected to the driving spindle of the power device, the three jaws are mounted respectively in the three guiding grooves spaced equally on the body and provided with threads to form screw drive with the nut. Rotating the outer sleeve connected with the nut will cause the jaws to move in the guiding grooves relative to the body, resulting in that the tool handle is clamped or released.

For the above structure, the thread between the jaws and the nut produces very large contact stress under working load, which leading the friction of the relative slide being large. Consequently, the clamping force for clamping the tool handle, produced by the screw drive between the nut and the jaws, is difficult to be large enough. Such that the tool handle can not be clamped tightly by the jaws under the operating condition of heavy load and vibration. Additionally, for those published anti-loose structures, the anti-loose effects are not good enough because of the structure limitation. For instance, in PCT/CN02/00375, there is a hidden-trouble of looseness in the structure under the operating condition of vibration and impact.

It has been known that some clamping structures adopted the one-way clutch in order to improve the performance of the locking engagement and prevent the release of the jaws during the operation process.

U.S. Pat. No. 5,031,925 disclosed a clamping structure for rotary tool with one-way clutch. FIG. 47 is a longitudinal partial-sectional front view of the clamping structure in prior art, and FIG. 48 is a cross sectional view of the clamping structure taken along position I-I in FIG. 47. As shown in FIGS. 47 and 48, the clamping structure comprises chuck body 1', rear cap 2', three pawls 3', a control outer sleeve 4', a pawl seat 5', a pawl 6', and a control member 7', wherein the chuck body 1' has longitudinal central axis and connects at its rear end to a driving shaft of a driving apparatus for driving the chuck body 1' to rotate about the central axis. The rear cap 2' is provided fixedly at the rear end of the chuck body 1' and has longitudinal strias on its circumference forming a grasping portion. The control outer sleeve 4' is mounted rotatably around the exterior of the chuck body 1' and locates at the front of the rear cap 2', the outer surface thereof forming with a second grasping portion. The control outer sleeve 4' is connected at its inner side to the control member 7' and drives it. The control member 7' depresses the rear end of the pawl member 6' to disengage the pawl 6' a at the front end from the ratchets provided at the chuck body 1'.

The pawl member of the clamping structure engages the ratchets with its pawl portion in the state of operation. When the tool handle being clamped is to be released, it is required to disengage completely the pawl portion from the ratchets. However, in the current clamping structure, the mechanism that disengage the pawl portion of the pawl member from the ratchets is not reliable such that a half-disengagement state is often caused, therefore when releasing or re-clamping the tool handle, the pawl and the ratchets scrapes from each other, resulting in the phenomenon of teeth scraping, which lessens the performance of the clamping structure.

SUMMARY OF THE INVENTION

The object of the present invention is to provide a one-way clutch capable of eliminating the phenomenon of teeth scraping between the pawl and the ratchets, aiming at the disadvantages of the existing technique.

Another object of the present invention is to provide a clamping structure adopting said one-way clutch.

A further object of the present invention is to provide a clamping structure capable of producing greater tightening torque.

In order to solve the technical problems mentioned above, based on one aspect of the present invention, a one-way clutch is provided, comprising 1 ratchet member having a plurality of ratchets on its circumference; 2 pawl seat capable of being mounted rotatablely around the exterior of the ratchet member; 3 pawl member capable of being disposed pivotally on the pawl member and having pawl, that pawl engaging with the ratchet by being depressed on the ratchet member; 4 control outer sleeve capable of being rotatablely mounted on the pawl seat and connecting with the integral or separate control member thereon, wherein the control member is provided with control portion used for coupling with the pawl member, thereby when the control outer sleeve is rotated to the first position along the first direction, the pawl engages with the ratchet, and when the control outer sleeve is rotated to the second position along the second direction, the pawl disengages with the ratchet, characterizing in that at least one of the control portion or the pawl member has a first surface which may be in contact with the other one of the control portion or the pawl member such that the pawl member exerts a force towards the second direction onto the control portion.

Preferably, the pawl member is a resilient member, having a first projection and the first surface therein, wherein the first surface is located at the second direction side of the first projection towards the second direction and forms a side of the first projection.

Preferably, the pawl member comprises: a pawl arm forming the pawl at the distal end; a mounting and controlling arm provided with the first projection and the first surface; pivot portion connecting between the pawl arm and the mounting and controlling arm and positioning radially the pawl member relative to its pivoting axis.

Preferably, the pivot portion of the pawl member is a circle-ring shaped structure formed by bending with a bending angle more than 180 degrees and less than 360 degrees.

Preferably, the pawl seat is provided with a pivot opening opened radially with a circular inner wall, wherein the circular inner wall of the pivot opening extends circumferentially exceeding 180 degrees and associates with the outer circumference of the pivot portion of the pawl member such that the pivot portion is positioned pivotally in the pivot opening.

Preferably, a pin is mounted in the pivot opening and the pivot portion is fitted around the pin.

Preferably, the pin is inserted in the pivot portion to maintain the pivot portion matching with the circular inner wall of the pivot opening.

Preferably, the other end of the mounting and controlling arm, which is opposite to the pivot portion, has a positioning portion, and the pawl seat is correspondingly provided with a positioning stud or a recessed positioning hole to fit with the positioning portion.

Preferably, a pawl mounting recess with a profile corresponding substantially to that of the pawl is provided along the inner wall of the pawl seat Preferably, the pawl seat is provided with a control recess for accommodating the control portion such that the control portion is moveable in the control recess and the two ends of the control recess limit the control portion in a clamping position and a releasing position respectively, and the clamping position and the releasing position correspond to the first position and the second position of the control outer sleeve, respectively.

Preferably, the control portion is provided with a raised rib that is in contact with the first projection of the pawl member when the control portion is at the clamping position.

Preferably, the control portion is provided with a raised positioning rib, and the pawl seat is provided with two positioning slots on the inner wall thereof for accommodating the raised positioning rib of the control portion so as to limit the control portion in a clamping position and a releasing position respectively, and the clamping position and the releasing position correspond to the first position and the second position of the control outer sleeve respectively.

Preferably, wherein the one-way clutch further comprises a disengagement-assisting resilient member, which is mounted on the pawl seat, to contribute the pawl of the pawl member to disengage from the ratchet of the ratchet member by engaging the control portion of the control member.

Preferably, the disengagement-assisting resilient member has a second projection and a second surface, wherein the second surface is located at the second direction side of the second projection towards the second direction and forms a side of the second projection Preferably, the disengagement-assisting resilient member is mounted longitudinally at one side of the pawl member, and the second surface thereof is in contact with the control portion to exert a force towards the second direction on the control portion.

Preferably, the exerting portion of the disengagement-assisting resilient member is located at the outside of the pawl, such that when the control portion is in the clamping position, the control portion presses against the second projection to deform the disengagement-assisting resilient member, and the exerting portion of the disengagement-assisting resilient member biases the pawl of the pawl member against the ratchet of the ratchet member; and contrarily, when the control portion is in the releasing position, the disengagement-assisting resilient member returns to the original status, and the exerting portion thereof releases the biasing force to the pawl to disengage the same from the ratchet.

Preferably, the disengagement-assisting resilient member is mounted circumferentially at one side of the pawl member, and the second surface thereof is capable of being in contact with a second control portion provided on the control member and connected fixedly to the control portion for exerting a force towards the second direction on the second control portion.

Preferably, the exerting portion of the disengagement-assisting resilient member is located at the outside of the pawl, such that when the control portion is in the clamping position, the second control portion presses against the second projection to deform the disengagement-assisting resilient member, and the exerting portion of the disengagement-assisting resilient member biases the pawl of the pawl member against the ratchet of the ratchet member; and contrarily, when the control portion is in the releasing position, the disengagement-assisting resilient member returns to the original status, and the exerting portion thereof releases the biasing force to the pawl to disengage the same from the ratchet.

Preferably, the exerting portion of the disengagement-assisting resilient member is located at the inside of the pawl, such that when the control portion is in the clamping position, the second control portion presses against the second projection to deform the disengagement-assisting resilient member, and the exerting portion of the disengagement-assisting resilient member moves inwards, however, does not bias the pawl; and contrarily, when the control portion is in the releasing position, the disengagement-assisting resilient member returns to the original status, and the exerting portion thereof biases the pawl from the inside to disengage the same from the ratchet of the ratchet member.

Preferably, the control member is mounted at the front end of the control outer sleeve with the control portion extending rearward; and the pawl seat is located at the rear side of the control member.

Preferably, the control member is mounted at the inner surface of the control outer sleeve with the control portion extending forward; and the pawl seat is located at the front side of the control member.

Preferably, the control outer sleeve is integrated with the control member.

Preferably, the control member is further provided with a second control portion which extends in the second direction and forms a resilient arm having a projection, and the pawl seat has a releasing positioning slot and a clamping positioning slot, such that the projection fits in the releasing positioning slot and the clamping positioning slot when being in the releasing position and the clamping position respectively, and the free end of the resilient arm forms an exerting portion to engage with the pawl member and contribute the pawl member to disengage from the ratchet.

Preferably, the control member is further provided with a second control portion which extends in the second direction and forms a resilient arm having a projection, and the pawl seat has a releasing positioning slot and a clamping positioning slot, such that the projection fits in the releasing positioning slot and the clamping positioning slot when being in the releasing position and the clamping position respectively, and the free end of the resilient arm forms an exerting portion to engage with the pawl member and contribute the pawl member to disengage from the ratchet.

According to another aspect of the present invention, a clamping structure for a handled tool is further provided which is mounted on the driving spindle driven by a power source and contains any of said one-way clutches.

Said clamping structure comprises: a chuck body with a longitudinal central axis connected at its rear end to the drive shaft such that the body is driven to rotate about the central axis and having a plurality of equally spaced inclined holes; a plurality of jaws, disposed in the inclined holes of the body and having male thread on the rear portion and clamping portion on the front portion, such that the jaws slide forward and backward in the inclined holes to clamp or release the tool through screw transmission; a rear cap fixedly disposed at the rear end of the body and formed with a first grasping portion at its circumference; a control outer sleeve rotatably mounted around the exterior of the body, located at the front of the rear cap, and formed with a second grasping portion at its outer surface; and a driving nut mounted around the body and connected to the control outer sleeve indirectly, wherein the driving nut can be driven by rotating the control outer sleeve and has female thread for cooperating with the male thread of the jaws in its inner surface so as to drive the jaws; wherein the control outer sleeve forms the control outer sleeve of the one-way clutch.

The ratchet member is formed integrally with the body.

According to another aspect of the present invention, a planetary transmission mechanism is disposed between the pawl seat and the driving nut, and comprises: an outer gear ring fixedly connected to the body; an inner gear ring fixedly connected to the pawl seat; a planet carrier rotatablely mounted around the body, connected with the driving nut, and provided with a planet gear shaft; a planet gear rotatablely mounted on the planet gear shaft, located between the outer gear ring and the inner gear ring, and engaging with both the inner gear ring and the outer gear ring;

Preferably, the outer gear ring is integrated with the body.

Preferably, the inner gear ring is integrated with the pawl seat.

Preferably, the inner gear ring is located at the front end of the control outer sleeve, with its front end extending inwardly and radially, and an end face annular groove is set at the end face thereof, corresponding to the planet gear shaft, wherein the planet gear shaft extends in the end face annular groove and is movable along the end face annular groove relative to the inner gear ring.

Preferably, on the outer surface of the front end of the body is provided with an annular groove, in which a clip ring, being in contact with the front end of the outer gear ring, is mounted, such that the outer gear ring is prevented from moving forward axially.

Preferably, one of the planet carrier and the driving nut is provided with a projecting key and the other one has a recess cooperating with the projecting key.

Preferably, the planet carrier and the driving nut are connected through spline.

Preferably, the control outer sleeve extends inward circumferentially at the front end thereof to form a positioning key and a connecting notch, and a flange is formed at the bottom of the connecting notch;

the control member forms a front cover at the front end of the control outer sleeve, the front cover extends rearward at the circumference thereof and forms corresponding positioning notch and connecting key, and the connecting key forms groove at the outer surface thereof;

the flange matches with the groove such that the control outer sleeve is connected with the front cover. (see FIGS. 7-10)

Preferably, the front cover has a rabbet facing the rear end in the inner surface. The positioning key at the front end of the control outer sleeve extends inward beyond the rabbet and is spaced properly from the end face of the rabbet axially. Sequentially, a support ring is positioned in the rabbet such that the support ring cannot axially move, relatively to the control outer sleeve and the front cover.

Preferably, the body has an annular groove with a clip ring mounted therein on the outer surface of the front end of the body. The clip ring is in contact with the support ring to prevent the support ring from shifting forward axially.

Preferably, an antifriction bearing is disposed between the planet carrier and the body.

Preferably, the ratchet member of the one-way clutch and the planet carrier are fixedly provided at the driving nut, and the outer gear ring is fixedly provided at the body.

Preferably, the ratchet member of the one-way clutch and the planet carrier are integrated with the driving nut, and the outer gear ring is integrated with the body.

The present invention may achieve the following advantageous effects:

During the process of the control outer sleeve being rotated in opposite direction (the second direction) to release the tool handle, the control portion of the control member rotates accordingly, which further drives the force-exerting portion of the disengagement-assisting resilient member to exert an assistant resilient force toward the rigid pawl while keeping the engagement between the rigid pawl of the pawl member and the ratchets. When moving to the position corresponding to the critical state that the pawl is to disengage from the ratchets, the control portion assists the driving key to continuously move to the position corresponding to the sufficient disengagement between the pawl and the ratchets. Accordingly, the half-disengagement state between the pawl and the ratchets is avoided.

Through the planet mechanism, by rotating the control outer sleeve manually to bring the control portion of the control member, a larger rotation moment is created, such that when the driving nut is rotated relative to the chuck body to generate a relative movement between the threads of the driving nut and the jaws and the jaws is forced to move along the inclined hole of the chuck body, the tool handle can be clamped at a larger force.

BRIEF DESCRIPTION OF THE DRAWINGS

The above and other objectives and features of the present invention will become apparent from the following description of preferred embodiments, given in conjunction with the accompanying drawings, in which:

FIGS. 7 and 8 are a partial sectional front view and a top view of the control outer sleeve, respectively;

FIGS. 9 and 10 are a partial sectional front view and a top view of the front cover, respectively, and FIG. 11 is an enlarged sectional view along line C-C in FIG. 9;

DESCRIPTION OF PREFERRED EMBODIMENTS

The clamping structure proposed in the present invention is used for clamping the handled tools with the primary function of producing rotational movement, e.g. drilling bit, tap, reamer, etc. For convenience, these are called as tool handle in this specification. The further description of the present invention is given as follows in conjunction with the attached drawing.

In the description, the term of "forward" is defined as the direction toward the tool handle and the term of "rearward" is defined as the direction toward the driving spindle of the power source. Both directions are relative to the clamping structure itself. When describing in conjunction with the attached drawings, "forward" is generally called as "down", and "rearward" is called as "up" unless otherwise indicated or it is obvious that said indications are unreasonable.

Figure 1:
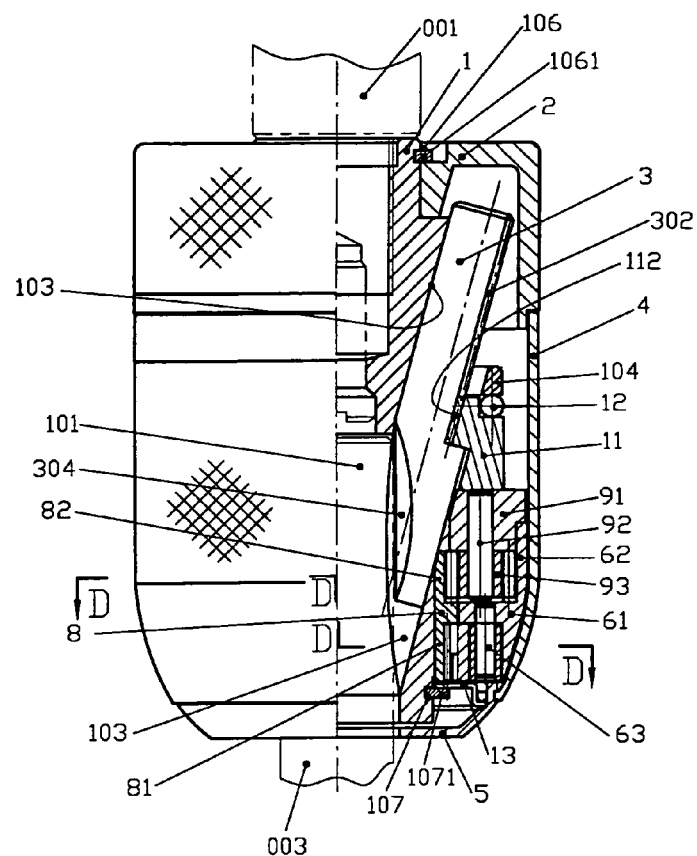
FIG. 1 is a front partial sectional view of the clamping structure for a handled tool according to the first, second and fifth embodiments of the present invention, wherein the clamping structure employs the one-way clutch according to the present invention.

Referring to FIG. 1, there is shown the front partial-sectional view of the clamping structure for a handled tool in accordance with the first embodiment of the present invention. The clamping structure adopts the one-way clutch proposed in the present invention.

The clamping structure contains the body 1 located on the center and having a longitudinal central axis, which is connected at its rear portion to the driving spindle 001 of the power source through a screw hole or a cone hole and forms at its front portion an accommodating space 101 for clamping tool handle. A counter bore 102, located in the accommodating space 101, is used for accommodate the head of the screw which connects the body to the driving spindle. There are a plurality of inclined holes 103 disposed equally around the central axis of the body on the body. A support stand 104 is disposed on the surface of the body as well.

In addition, the body 1 is provided with annular grooves 106 and 107 on the outer surfaces of its front portion and rear portion respectively. 2 clip rings 1061 and 1071 are mounted in said annular grooves respectively.

A plurality of jaws 3 are mounted in the inclined holes 103 of the body 1. The jaws are arranged with the nonholonomic (i.e., partial) male thread 302 on its rear portion and with clamping portion 304 on its front portion. The clamping portion 304 is approximate multi-prism used for clamping the tool handle.

The rear portion of the body 1 is fixedly mounted with rear cap 2 which can connect with the rear portion of the body through holes and fasteners, or through spline or in the manner of tight fit. The circumference of the rear cap 2 extends forward to form a first grasping portion.

A control outer sleeve 4 is provided in the front of the rear cap 2 and rotatablely mounted around the body 1. Referring to FIG. 7 and FIG. 8, there are shown the front partial sectional view and the top view of the control outer sleeve 4. The control outer sleeve 4 is provided with a through-hole 401 in the central section thereof and a second grasping portion having reticulate pattern convenient for grasping on the external surface. The down portion of the control outer sleeve extends inwardly and axially to form flange 403 and further extends at part of the flange 403 to form connecting key 404. Between the connecting keys forms connecting notch 402. Preferably, the both sides of the connecting key 404 in circumferential direction form bending portion 405 facing up.

Figure 12:
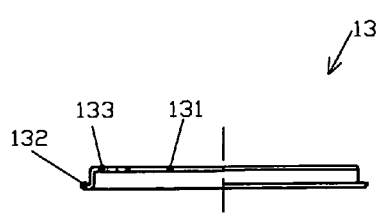
FIG. 12 is a front sectional view of the support ring.

In front of the body, a front cover 5 is fixedly connected with the front portion of the control outer sleeve. FIG. 9 is the front sectional view of the front cover 5, FIG. 10 is the top view of the front cover 5 and FIG. 11 is the enlarged sectional view taken along line C-C in FIG. 9. Referring FIG. 9 to FIG. 11, the front cover 5 is a plate-shaped member, wherein the bottom of its cover body 510 is flat, and provided with a through hole 501 in the middle, through which the tool handle passes. The circumferential part of the front cover is cone surface and a plurality of segments extend partially and upwardly at the circumference to form the connecting key 502 correspondingly matching to the connecting notch of the control outer sleeve 4. Correspondingly, between connecting keys 502 forms connecting notch 504. Two connecting keys extend upwardly for relatively long distance to form control portion 506 on which a raised rib 507 projecting outwardly is located. Every connecting key is provided with an annular recess groove 503 on the surface. The annular recess groove 503, matched to the flange 403 of the control outer sleeve 4, axially fixes the front cover 5 relative to the control outer sleeve 4. Simultaneously, the connecting key 502 and the connecting notch 504 of the front cover 5 are matched to the connecting notch 402 and the connecting key 404 of the control outer sleeve 4 respectively, which circumferentially fixes the front cover 5 relative to the control outer sleeve 4. Consequently, the front cover 5 is fixedly mounted on the control outer sleeve 4. Further, the front cover 5 is provided with rabbet 508 on the top portion of the inner wall, used for fitting to a support ring 13. The positioning key 404 on the front portion of the control outer sleeve 4 extends inwardly beyond said rabbet 508, having proper axial distance from the end face of said rabbet, sequentially the supporting ring 13 is arranged in said rabbet. FIG. 12 is the front sectional view of the supporting ring 13. The supporting ring comprises through-hole 131, flange 132 and supporting portion 133. The supporting ring 13 is axially unmovable relatively to the control outer sleeve 4 and the front cover 5. The front cover 5 is used as a member to control the one-way clutch engaging and disengaging, which will be described in detail later.

Figure 13:
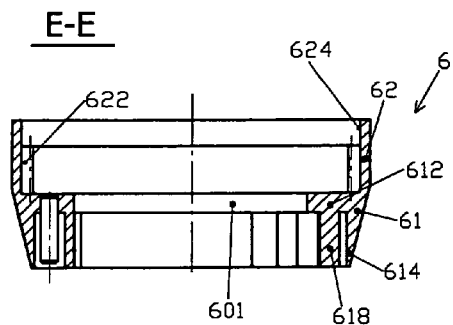
FIG. 13 is a front sectional view of the ring seat (6) in the clamping structure according to the first embodiment of the present invention taken along the section E-E in FIG. 14.
Figure 14:
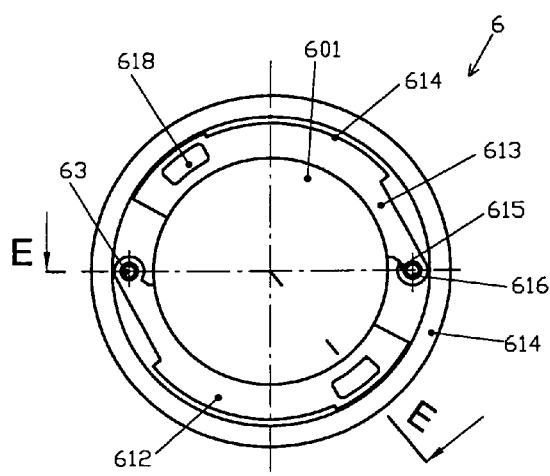
FIG. 14 is a bottom view of the ring seat (6)

An annular seat 6 is mounted inside the control outer sleeve 4 and presents the profile on the external surface matching to the inner surface of the control outer sleeve 4. FIG. 13 is the front sectional view of the annular seat 6 taken from the section E-E in FIG. 14, and FIG. 14 is the bottom view of the annular seat 6. Referring to FIGS. 13 and 14, the annular seat 6 comprises pawl seat portion 61 located on the bottom portion and inner gear ring portion 62 located on the top portion, having a through hole 601 in its central portion. A pawl mounting recess 613, used for accommodating the pawl member 71, is on the inner wall of the pawl seat portion 61. The profile of the pawl mounting recess 613 basically corresponds with that of the pawl member 71. On the top portion, the pawl mounting recess 613 is provided with a flat extending portion 612 formed by inwardly extending of the inner wall of pawl seat portion 61 and corresponded with the pawl mounting recess 613. The flat extending portion 612 extends downwardly to form a rectangular positioning stud 618. The pawl mounting recess 613 is further provided with control recess 614 used for accommodating the control portion 506 of the front cover 5. Simultaneously, two circumferential ends of the control recess 614 are pushed, through the rotation of the control portion 506 of the front cover 5, to sequentially drive the annular seat 6 rotating along the first direction (clamping direction, i.e., the counter clockwise direction in FIGS. 2-6) or the second direction (releasing direction, i.e., the clockwise direction in FIG. 2-FIG. 6). In order to mount the pivot portion 716 of the pawl member 71, the pawl seat portion 61 is further arranged with a pivot opening 615 opened in radial direction with a circular inner wall. The circular inner wall of the pivot opening extends circumferentially over 180 degrees and is matched to its circumference, resulting in pivotally positioning the pivot portion 716 in the pivot opening 615.

Optionally, the pivot opening 615 may be provided with a pin hole 616, in which a pin 63 is mounted, leading the pawl member 71 pivoting about the pin 63.

Preferably, the circular inner wall of the pivot opening circumferentially extends for between 200 degrees and 300 degrees.

Figure 15:
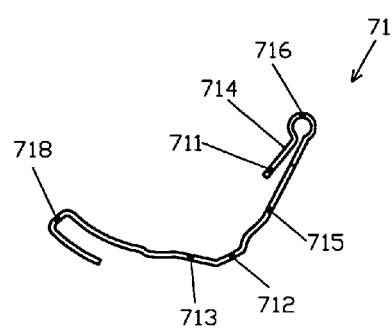
FIG. 15 is a structure schematic view of a pawl member (71)

The pawl member 71 is a resilient metal flake or other resilient member, e.g., spring steel wire. FIG. 15 is the structural schematic view of the pawl member 71. The pawl member 71 comprises pawl arm 714, mounting and controlling arm 715 and pivot portion 716. The distal end of the pawl arm 714, a free end, forms a pawl 711. The mounting and controlling arm 715 is provided with a first projection 712 and a first slope 713 located in the middle and a positioning portion 718 located on the distal end. The first slope 713 is located on one side of the releasing direction (the second direction, i.e., the counter clockwise direction in FIG. 2 and FIG. 3) and forms the side of the first projection 712. The positioning portion 718 is used for positioning and mounting the pawl member 71 from one end. The positioning portion 718 is bended to have a rectangle profile matching to the positioning stud 618 of the annular seat 6 and mounted around the positioning stud 618. The pivot portion 716 is connected to the pawl arm 714 and the mounting and controlling arm 715 and radially positions and mounts the pawl member 71 relative to its pivot axis from the other end.

Optionally, if the pawl seat portion 61 of the annular seat 6 is not provided with the positioning stud 618, but is provided with a positioning recess or slot, then the positioning portion 718 can form a flange facing up and having corresponding shape to the positioning recess or slot, which performs the same function of positioning.

Optionally, the pivot portion 716 is a circle-ring shaped structure formed by bending with a bending angle more than 180 degrees and less than 360 degrees. However, in other situation, e.g., situation of said pawl member being made of resilient steel wire, the pivot portion 716 may be bended to be a circular structure with bending angle larger than and equal to 360 degrees, and is connected to the pawl arm 714 and the mounting and controlling arm 715 respectively through the intersection point.

Figures 2, 3:
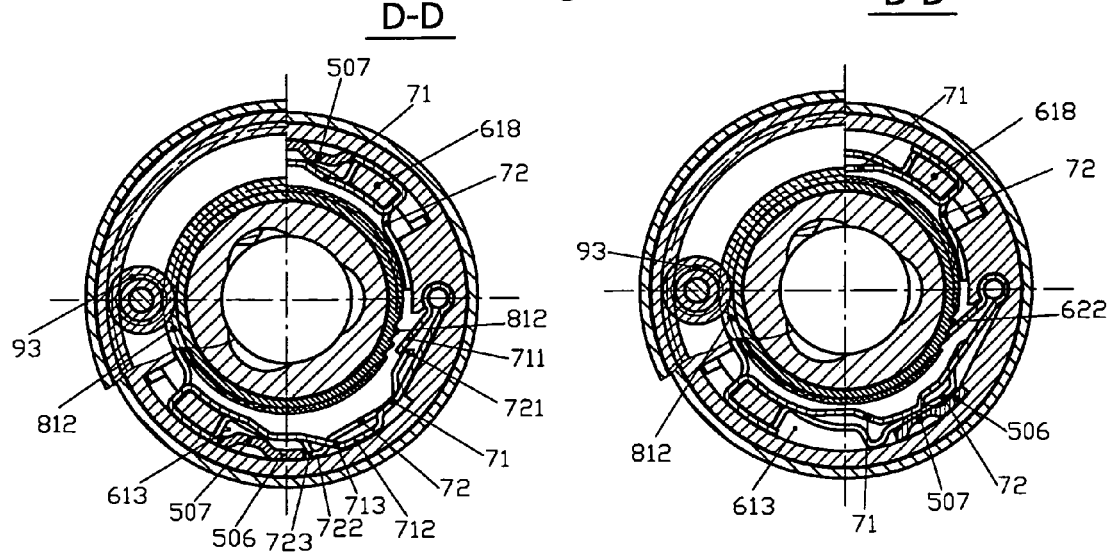
FIG. 2 is a sectional view taken along the section of D-D in FIG. 1 according to the first embodiment of the present invention, wherein the one-way clutch is in a disengagement state.
FIG. 3 is a sectional view taken along the section of D-D in FIG. 1 according to the first embodiment of the present invention, wherein the one-way clutch is in an engagement state.
Figure 16:
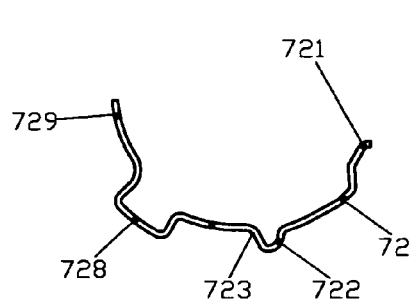
FIG. 16 is a structure schematic view of the disengagement-assisting resilient member (72) shown in FIGS. 2 and 3.

Preferably, as shown in FIG. 2, a disengaging-assistance resilient member 72 is mounted abreast in longitudinal direction below the pawl member 71 and used for according action with the pawl member 71 under the control of the control portion 506 of the front cover 5, resulting in assisting the pawl member 71 disengaging and engaging. There is more detailed description in the later text. FIG. 16 is the structural schematic view of the disengaging-assistance resilient member 72. As shown in the Fig., the disengaging-assistance resilient member 72 comprises the exerting portion 721 located at one end, the second projection 722 and the second slope 723, both located in the middle, the distal positioning portion 729 located at the other end and the mounting portion 728 between the distal positioning portion 729 and the second slope 723. The second slope 723 is located on said second side of the second projection 722, towards the releasing direction (the second direction, i.e., the counter clockwise direction in FIG. 2 and FIG. 3), and forms the side of the second projection 722. According to the principle of the present invention, it can be disclosed that, because the first slope 713 of the pawl member 71 can exert a force (component force) to the control portion along the second direction, the object of the present invention can be achieved all the same even if without installation of the disengaging-assistance resilient member.

Figure 17:
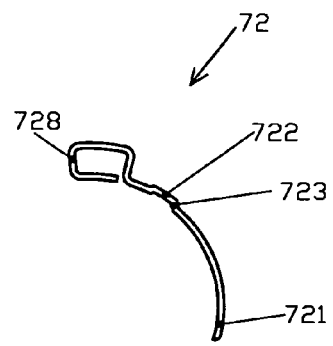
FIG. 17 is a structure schematic view of another disengagement-assisting resilient member (72)

Optionally, if the mounting portion 728 is capable of carrying out essentially the function of mounting and positioning, the distal positioning portion 729 may not be provided. FIG. 17 shows the kind of such disengaging-assistance resilient member 72. The mounting portion 728 of the disengaging-assistance resilient member 72 is bended to have the rectangle profile matching to the positioning stud 618. Consequently, it can fulfill the function of positioning as the pawl member 71.

As shown in the Fig., the surfaces mentioned above (e.g., the first slope 713) are flat. Optionally, the flat can be replaced by a cambered surface to carry out the same function.

Figure 18:
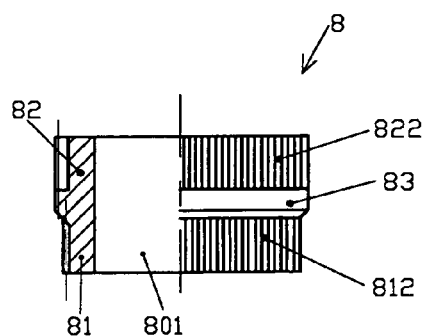
FIG. 18 is a front sectional view of a ring sleeve (8)

Referring to FIG. 1, an annular sleeve 8 is fixedly mounted on the body 1 at the position corresponding to the annular seat 6. FIG. 18 is the front sectional view of the annular sleeve 8. Referring to FIG. 18, the annular sleeve 8 is provided with a through hole 801 at its center, comprising the ratchet member portion 81 located in the bottom portion, the outer gear ring portion 82 located in the top portion and the transition portion 83 between the ratchet member portion 81 and the outer gear ring portion 82. The ratchet member portion 81 is arranged with a plurality of ratchets 812 circumferentially and equally on the outer surface. The outer gear ring portion 82 is arranged with a plurality of teeth 822 circumferentially and equally on the outer surface. Under the mounting condition, the ratchet member portion 81 and the outer gear ring portion 82 of the annular sleeve 8 are respectively corresponding to the pawl seat portion 61 and the inner gear ring portion 62 of the annular seat 6, and the outer surface of the transition portion 83 may cooperates with the inner surface of the through hole 601 of the annular seat 6.

Optionally, it is possible to form the separate ratchet member and the outer gear ring, respectively, and be fixedly mounted around the outer surface of the body 1. In such way, the similar effects can be produced. Or optionally, the ratchet member portion 81 and/or the outer gear ring portion 82 are integrated with the body.

Figure 19:
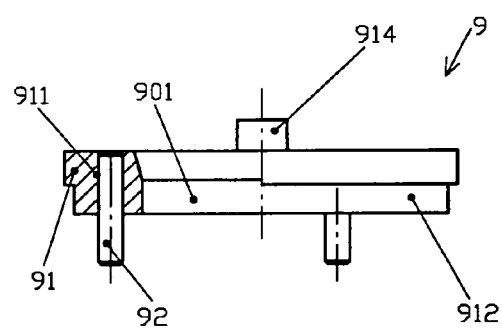
FIG. 19 is a front sectional view of a planet carrier (9)

Continuously referring to FIG. 1, a planet carrier is mounted on the top portion of the accommodating space between the outer gear ring portion 82 of the annular sleeve 8 and the inner gear ring portion 62 of the annular seat 6. FIG. 19 is the front sectional view of the planet carrier. Referring to FIG. 19, the planet carrier 9 is provided with a through hole 901 in its central portion. The body 91 of the planet carrier 9 is circumferentially and equally provided with 3 mounting holes 911, in which three planet gear shafts 92 are mounted respectively. The planet gear shaft 92 extends downwardly, having the planet gear 93 thereon. The planet gear 93 is located in the accommodating space between the outer gear ring portion 82 of the annular sleeve 8 and the inner gear ring portion 62 of the annular seat 6, having circumferentially arranged teeth on the outer surface simultaneously engaging with the teeth of the outer gear ring portion 82 of the annular sleeve 8 and the inner gear ring 62 of the annular seat 6 respectively. In this way, when the annular sleeve 8 is rotating relatively to the annular seat 6, the planet gear rotates about the central axis, leading the body 91 of the planet carrier rotating. A rabbet 912, formed on the outer surface of the bottom portion of the body 91 of the planet carrier, is matched to the top circumference of the inner gear ring portion 62 of the annular seat 6. The top portion of the body 91 of the planet carrier extends upward to form the projection key 914.

Figure 20:
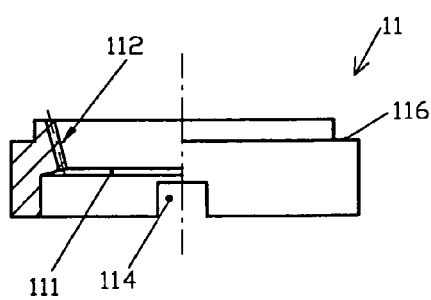
FIG. 20 is a front sectional view of a driving nut (11)

The top portion of the body 91 of the planet carrier is connected to a driving nut 11. FIG. 20 is the front sectional view of the driving nut 11. As shown in the Fig., the bottom portion of the driving nut 11 is provided with a groove corresponding to the projection key 914 of the top portion of the planet carrier body 91, such that the driving nut 11 is connected with the planet carrier 9 together. Optionally, it is feasible to arrange a groove on the planet carrier body 91 while a projecting key on the driving nut 11 to match to each other.

The driving nut 11 has a through hole 111 in the central portion. The inner surface of the through hole is provided with cone surface portion, along which the female thread 112 is formed and engages with the male thread of the pawl 3. Consequently, when rotating, the driving nut 11 drives the pawls 3 sliding in both forward and backward directions along the inclined holes 103 of the body 1, resulting in that the pawls 3 clamp or release the tool handle which is within the pawls 3. The top portion of the driving nut 11 is in contact with the support stand 104 of the body 1 to support the driving nut 11 and position the same axially. Preferably, the driving nut 11 is provided with a rabbet 116 on the top portion such that a bearing 12 is mounted between the driving nut 11 and the support stand 104 for reducing the friction resistance.

Figure 21:
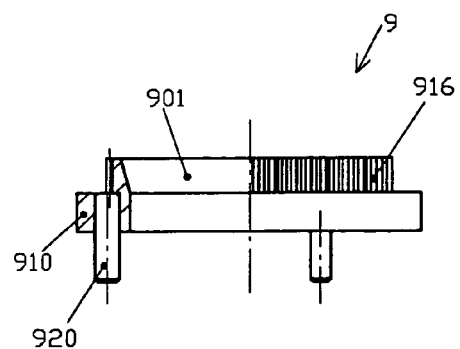
FIG. 21 is a planet carrier (9) with outer spline (916)
Figure 22:
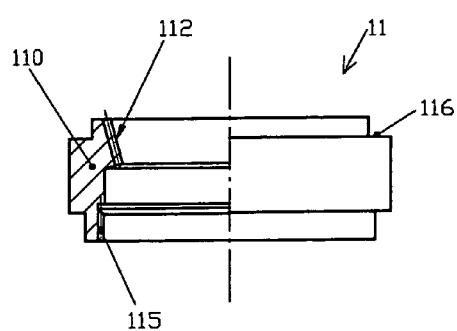
FIG. 22 is a driving nut (11) with inner spline (115)

Certainly, other familiar connecting structure can be used to connect the driving nut 11 and the planet carrier 9. FIG. 21 shows the planet carrier 9 with male spline 916 and FIG. 22 shows the driving nut 11 with female spline 115. Optionally, it is possible to arrange the male spline on the body 91 of the planet carrier and the corresponding female spline on the driving nut 11.

The following is the description of the operation principle of the first embodiment of the present invention, in conjunction with FIG. 1 to FIG. 6.

As shown in FIG. 1, a tool handle 003 is inserted in the accommodating space 101, used for receiving the tool handle, in the body 1 and the control outer sleeve 4 is rotated along the clamping direction (the first direction, i.e., the counter clockwise direction in FIG. 2 to FIG. 6) relatively to the rear cap 2 mounted on the body 1.

The connecting key 404 of the control outer sleeve drives the front cover 5 along the first direction through the engagement between the connecting key 404 and the connecting groove 504 of the front cover 5. Correspondingly, the control portion 506 of the front cover 5 rotates along the first direction. The control portion 506 extends upwardly to the space between the pawl seat portion 61 of the annular seat 6 and the ratchet member portion 81 of the annular sleeve 8 and is circumferentially located in the control recess 614 of the pawl mounting recess 613. The pawl member 71 and the disengaging-assistance resilient member 72 are mounted in the pawl mounting recess 613. The control portion 506 is located at the mounting and controlling arm of the pawl member 71, and between the disengaging-assistance resilient member 72 and the inner surface of the pawl mounting recess 613. While the control outer sleeve 4 is rotated along the first direction, the control portion is in contact with the second slope 723 of the disengaging-assistance resilient member 72 to drive the annular seat 6, the planet carrier 9 and the driving nut 11 rotating along the first direction, which drives the pawls 3 move forwardly.

As shown in FIG. 2, the clamping structure is under the releasing condition. The control portion 506 is at the left end (releasing position) of the control recess 613 and does not exert force to the first slope 713 of the pawl member 71 and the second slope 723 of the disengaging-assistance resilient member 72. Here, the pawl member 71 and the disengaging-assistance resilient member 72 are not deformed, whereon the pawl 711 and the exerting portion 721 are radially located on the outer side respectively and keeping in free state. And the pawl 711 keeps in disengagement from the ratchet 812 of the ratchet seat portion 81 of the annular sleeve 8.

After the jaws 3 come into contact with the tool handle, the control outer sleeve 4 is rotated continuously along the first direction. Then the control portion slides from left end to right end in the control recess 613 along the inner wall of the control recess 613. The pressure toward the second slope 723 and the first slope 713 is gradually increased, resulting in that the second projection 722 and the first projection 712 are pushed down, which deforms the pawl member 71 and the disengaging-assistance resilient member 72, such that the pawl 711 radially shifts to the ratchet member portion 81 and is attached to the ratchet 812 of the ratchet member portion 81. The control outer sleeve 4 is continuously rotated, leading the front portion of the control portion 506 sliding rightward in the control recess 613 to be in the status of what shown in FIG. 3.

When the status is as shown in FIG. 3, the control portion 506 is located at the right end (clamping position) of the control recess 613, such that the right end of the control portion 506 is in contact with the right end of the control recess 613. Simultaneously, the raised rib 507 on the control portion 506 travels over the second projection 722 and the disengaging-assistance resilient member 72 returns to its original status, and the second projection 722 is sequentially leftward to the control portion 506 resulting in the control portion 506 is kept in the clamping position. At this time, because of the one-way engagement between the pawl 711 and the ratchet 812, the pawl member 71 and the annular seat 6 thereon are incapable of moving along the second direction such that the anti-loose luck-in is achieved. However, here the annular seat 6 is still capable of rotating along the first direction if the control outer sleeve 4 is sequentially rotated along the first direction. Consequently, the pawl 711 is capable of sliding on the crest of the ratchet 812 along the first direction to further clamping the tool handle.

While it is required to release the tool handle, the control outer sleeve 4 is rotated along the second direction. The control portion 506 of the front cover 5 will shift from the right end (clamping position) to the left end in the control recess 613 of the annular seat 6. It can be found, from FIG. 2 and FIG. 3, that the raised rib 507 of the control portion 506 and the right end of the control portion 506 will slide over the first slope 713 of the pawl member 71 and the second slope 723 of the disengaging-assistance resilient member 72 respectively, during the process of shifting from the right end to the left end. Since both the resilient deformations of the pawl member 71 and the disengaging-assistance resilient member 72 have the tendency of spring-back, the 2 surfaces will exert acting forces toward the control portion 506 and the component force of the circumferential direction will push the control portion 506 move along the second direction. It can be found as well, from FIG. 2 and FIG. 3, that when sliding along the second slope 723, the control portion 506 has been in completed disengagement from the first slope 713, such that the pawl 711 can disengages smoothly and assuringly from the ratchet 812 under the inherent resilient force of the pawl member 71. The pawl 711 will not slide on the crest of the ratchet 812, accordingly the phenomenon of "teeth scraping" is avoided effectively.

The Second Embodiment

Figure 4:
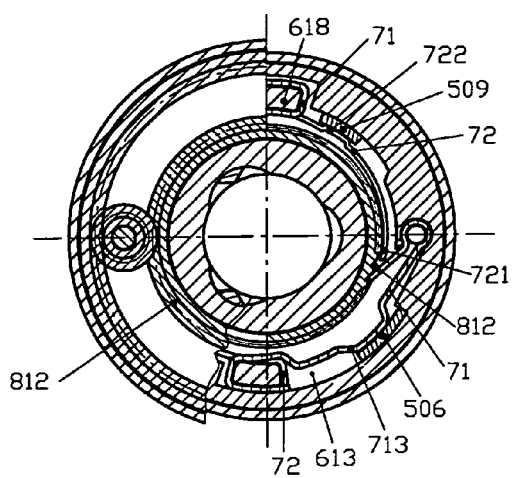
FIG. 4 is a sectional view taken along the section of D-D in FIG. 1 according to the second embodiment of the present invention, wherein the one-way clutch is in an engagement state.
Figure 5:
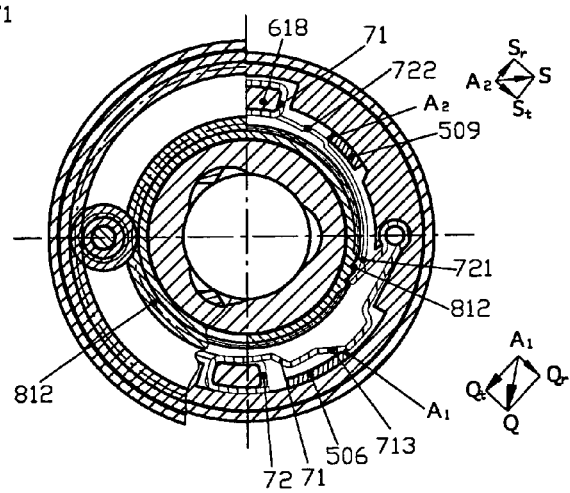
FIG. 5 is a sectional view taken along the section of D-D in FIG. 1 according to the second embodiment of the present invention, wherein the one-way clutch is in a half-disengagement state.
Figure 6:
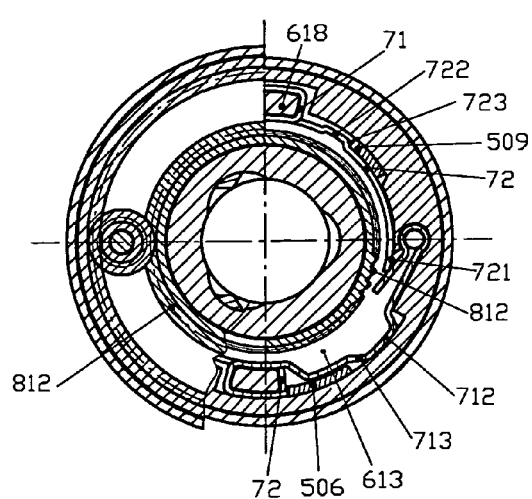
FIG. 6 is a sectional view taken along the section of D-D in FIG. 1 according to the second embodiment of the present invention, wherein the one-way clutch is in a disengagement state.

FIG. 4 to FIG. 6 are the structural schematic diagrams according to the second embodiment of the present invention and the front view, same as FIG. 1 of the first embodiment, is not given herein. The clamping structure adopts a different one-way clutch. The difference, between this one-way clutch and that adopted in the clamping structure shown in FIG. 2 and FIG. 3, is that the disengaging-assistance resilient member 72 is arranged on the side of the pawl portion 71 in the first direction circumferentially, and the exerting portion 721 of the disengaging-assistance resilient member is located on the inner side of the pawl 711 of the pawl member 71 to exert force from the inner side. In the clamping structure, the disengaging-assistance resilient member 72 of the one-way clutch adopts the structure shown in FIG. 16 and the second projection 722 and the second slope 723 of the disengaging-assistance resilient member, not located in the control recess 613, require a separate control portion. Thereby the front cover 5 (i.e., the control member) of the clamping structure adopts the configuration shown in FIG. 23 to FIG. 25.

Figure 23:
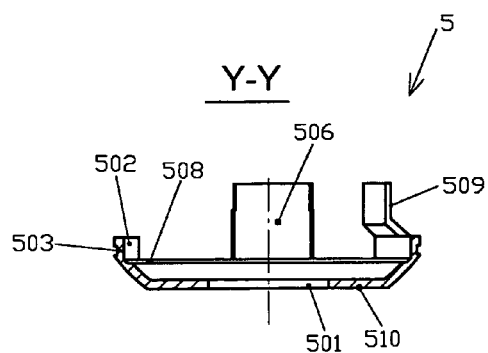
FIG. 23 is a front sectional view of another front cover (5) with different structure taken along position Y-Y in FIG. 24.
Figure 24:
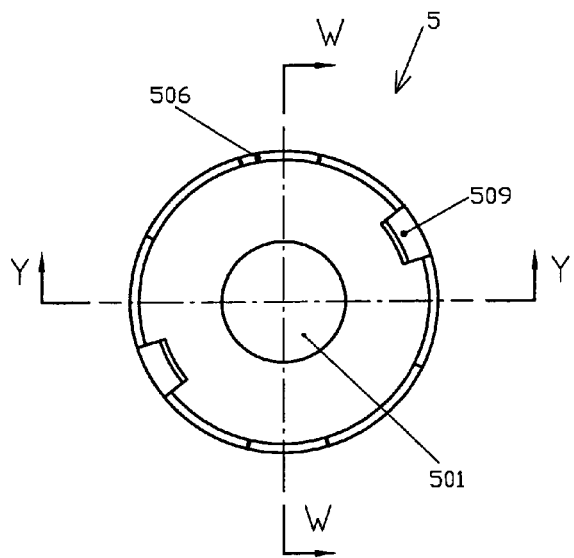
FIG. 24 is a top view of the front cover (5)
Figure 25:
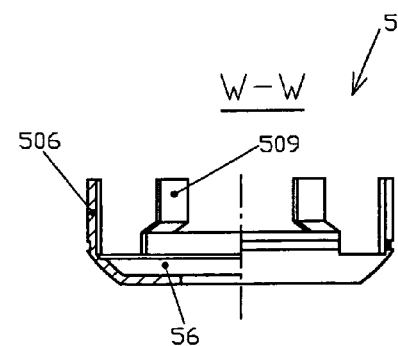
FIG. 25 is a sectional view of the front cover (5) taken along position W-W in FIG. 24.

FIG. 23 shows a front sectional view of the front cover 5 of this different structure taken along the line Y-Y in the FIG. 24. FIG. 24 is the top view of the front cover 5. FIG. 25 is a sectional view of the front cover 5 taken along the line W-W in FIG. 24. Referring to the Figs., the front cover is provided with two second control portions 509 besides two control portions 506. The second control portion 509, separating from the control portion 506, is closer to the central axis than the control portion 506 in the radial direction.

Referring to FIG. 4 to FIG. 6 again, the second control portion 509 extends upwardly to the space between the disengaging-assistance resilient member 72 and the inner wall of the pawl seat portion 61 of the annular seat 6 and rotates in said space synchronically with the control portion 506 of the control recess 613.

As shown in FIG. 4, the clamping structure is under the clamping condition. Here the control portion 506 is located at the right end (clamping position) in the control recess 613 and pressed against the first projection 711 of the pawl member 71. The pawl member 71 is deformed resulting in engagement between the pawl 711 and the ratchet 812. Simultaneously, the second control portion 509 is pressed against the second projection 722 and the disengaging-assistance resilient member 72 is deformed as well, such that the exerting portion 721 is located on the inner side (facing the ratchet), which does not affect the engagement between the pawl 711 and the ratchet 812.

FIG. 5 shows the disengaging process of the pawl 711 from the ratchet 812 when the clamping structure is changed from clamping condition to releasing condition. As shown in FIG. 5, the control outer sleeve 4 is rotated along the second direction, leading the control portion 506 and the second control portion 509 synchronically rotating to the releasing position. When moving away from the first projection 712 and the second projection 722 and coming into contact with the first slope 713 and the second slope 723, because of their inherent elastic restoring force, the pawl member 71 and the disengaging-assistance resilient member 72 respectively shift outwardly and consequently exert pressure Q and S onto the control portion 506 and the second control portion 509 respectively at the contact points A1 and A2. The pressure Q and S can be divided into the component forces Qr and Sr in the radial direction and Qt and St in the second direction (circumferential direction). The component forces Qt and St are exerted on the control portion 506 and the second control portion 509 respectively, such that the control portion 506 and the second control portion 509 continuously rotate along the second direction until reaching the releasing position. In addition, the pawl 711 can disengage smoothly from the ratchet with the combined effect of two elastic restoring forces. One is exerted from the inner side by the exerting portion 721 of the disengaging-assistance resilient member 72 and the other is the elastic restoring force possessed by the pawl member 71. The pawl 711 is incapable of sliding on the top of the ratchet 812, such that the phenomenon of "teeth scraping" is avoid effectively.

As shown in FIG. 6, the clamping structure is under the releasing condition. Here the control portion 506 is located at the left end (releasing position) of the control recess 613 and does not exert force onto the pawl member 71. Simultaneously, the second control portion 509 is on the releasing position as well and locates on the side of the second direction to the second projection 722 and the second slope 723 of the disengaging-assistance resilient member 72. At this time, the pawl member 71 and the disengaging-assistance resilient member 72 are not deformed, whereon the pawl 711 and the exerting portion 721 are located on the outside in radial direction. The inherent elasticity of the disengaging-assistance resilient member restores the exerting portion to the original state of being in outer side, then the exerting portion 721 on the inner side of the pawl 711 is able to further ensure the disengagement between the pawl 711 and the ratchet 812 of the ratchet seat portion 82 of the annular sleeve 8.

The Third Embodiment

Figures 26, 27:
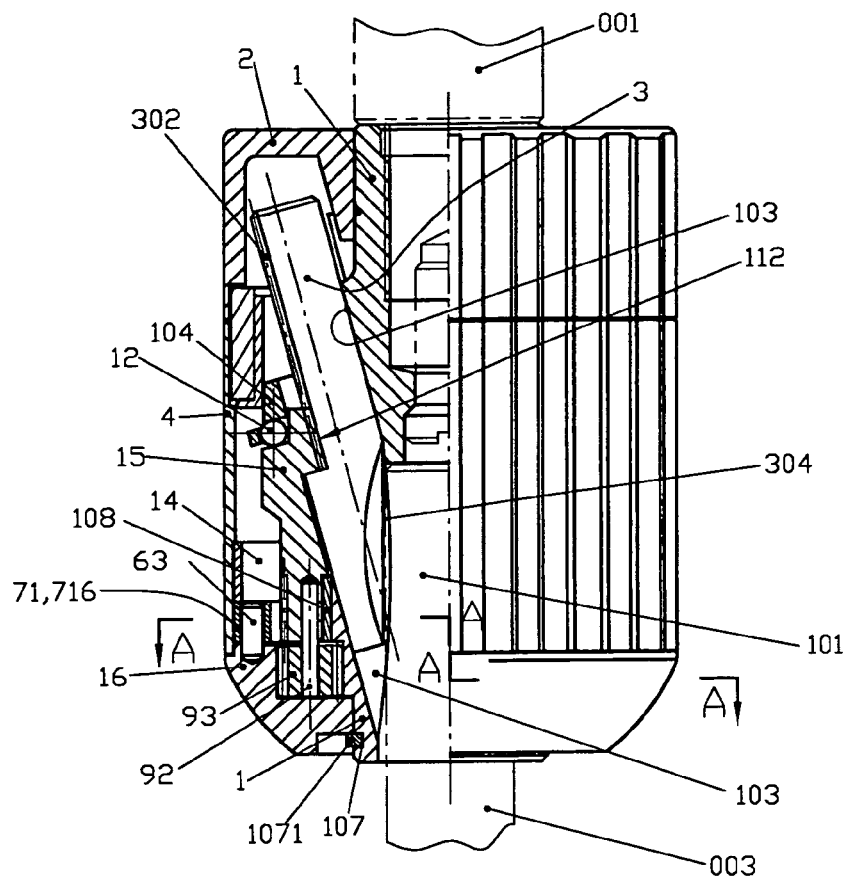
FIG. 26 is a front sectional view of the clamping structure according to the second embodiment of the present invention.
FIG. 27 is a schematic sectional view taken along position A-A in FIG. 26.
Figure 28:
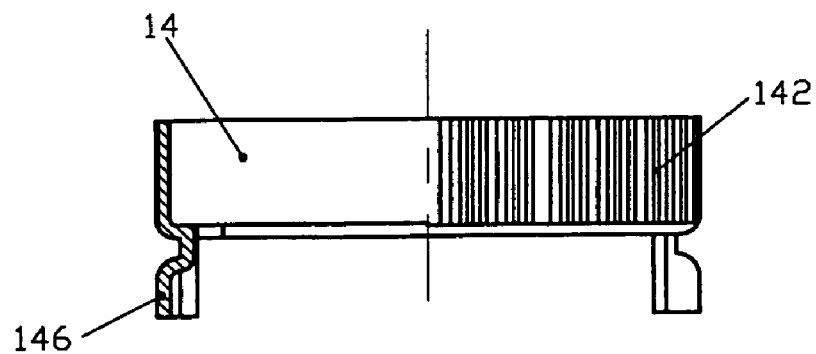
FIGS. 28 and 29 are a front sectional view and a bottom view of a control ring (14), respectively.
Figure 29:
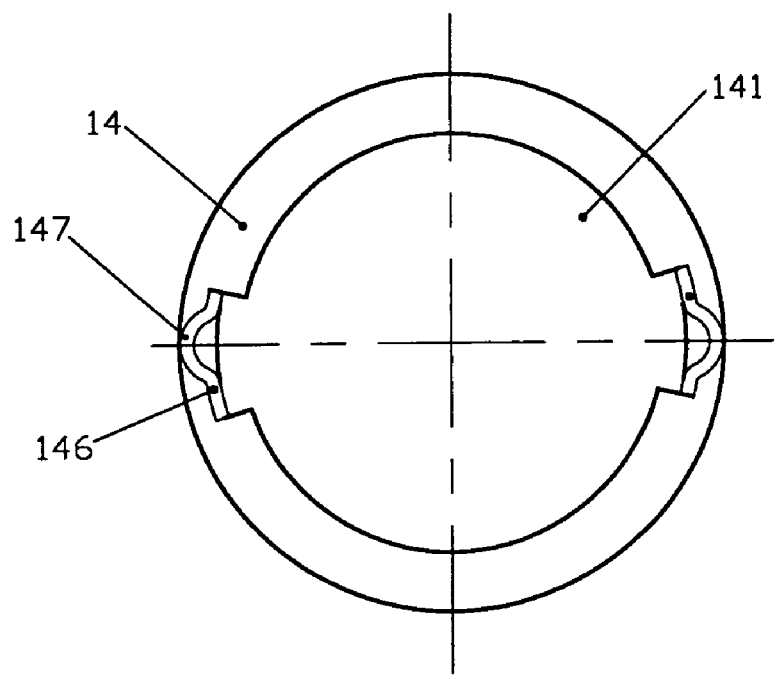

FIG. 26 is the front sectional view of the clamping structure in accordance to the third embodiment of the present invention. FIG. 27 is the sectional configuration diagram taken along the line A-A in FIG. 26. Referring to FIG. 26, the control outer sleeve 4 is provided with control ring (control member) 14 on the inner surface. FIG. 28 and FIG. 29 are the front sectional view and the bottom view of the control ring, respectively. Referring to FIG. 28 and FIG. 29, the control ring 14 is provided with a through hole 141 in the central portion and spline 142 on the outer surface, and fixedly connects with the inner surface of the outer sleeve through the spline. The bottom portion of the control ring 14 extends downwardly to form the control portion 146. The control portion 146 is provided with the raised rib 147.

Figure 30:
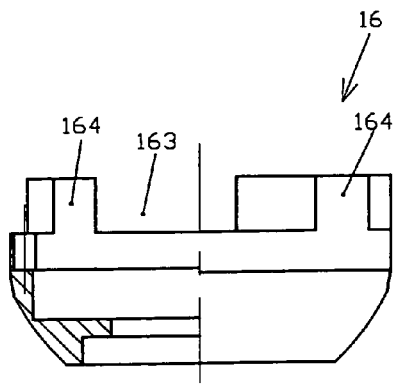
FIG. 30 is a front sectional view of a ring seat (16)
Figure 31:
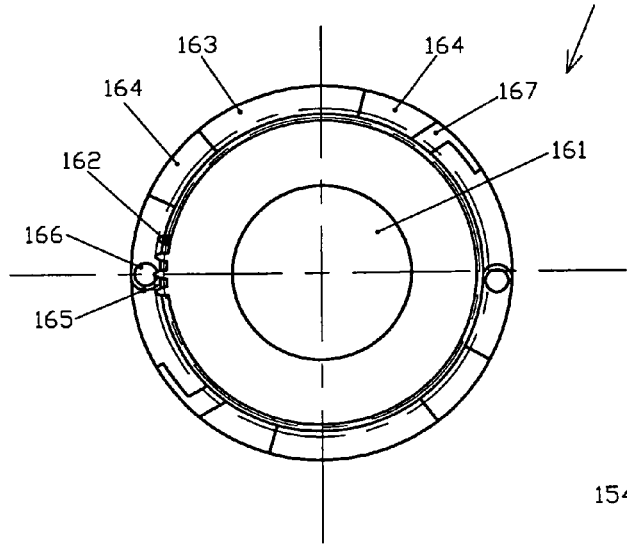
FIG. 31 is a bottom view of the ring seat (16)

The annular seat 16 is mounted on the bottom portions of the control outer sleeve 4 and the control member 14. FIG. 30 is the front sectional view of the annular seat 16. FIG. 31 is the top view of the annular seat 16. As shown in FIG. 30 and FIG. 31, the bottom portion of the annular seat 16 extends inwardly in the radial direction and is provided with a through hole 161. The annular seat 16 is arranged with inner teeth 162 on the inner surface of the sidewall, wherein the inner teeth and the sidewall constitute the inner gear ring. On the top portion of the sidewall form pivot opening 165, pin hole 166, projection portion 164, control recess 163 and positioning groove 167, which constitute the pawl seat together with the sidewall. The pivot opening is opening on its side and the inner surface thereof is used for matching to the pivot portion 716 of the pawl member 71. The pivot hole 165 shown in FIG. 31 does not exceed 180 degrees and cannot limit the pivot portion 716 by itself, thereby a pin hole 166 is arranged on the geometrical center of the pivot hole 165, wherein a pin 63 is mounted, such that the pawl member 71 can pivot about the pin 63. The annular seat 16 may be regarded as an integration of the pawl seat and the inner gear ring.

Figure 32:
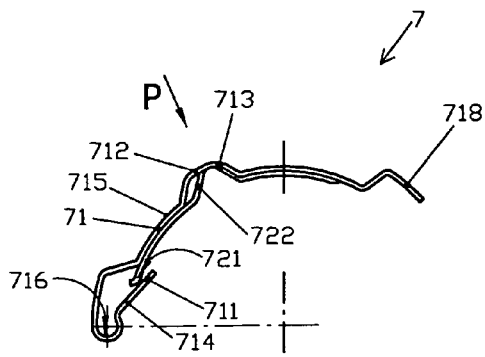
FIG. 32 is a schematic structure view of a resilient member (7)
Figure 33:
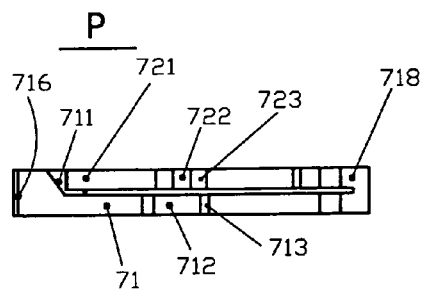
FIG. 33 is a view of the resilient member (7) in direction P.

FIG. 32 is the structural schematic view of the resilient member 7 and FIG. 33 is the view of the resilient member 7 in P direction. The resilient member 7 comprises the integrated pawl member 71 and the disengaging-assistance resilient member 72. The pawl member 71 contains the pawl arm 714, the mounting and controlling arm 715 and the pivot portion 716. The distal end of pawl arm 714 forms the pawl 711. The mounting and controlling arm 715 is provided with the first projection 712, the first slope 713 and the positioning portion 718 located at the distal end. The positioning portion 718 is wedged into the positioning groove 167 of the annular seat 16. The exerting portion 721, the second projection 722 and the second slope 723 of the disengaging-assistance resilient member 72 are integrated with pawl member 71 at the other end (positioning portion 718) opposite with the exerting portion 721.

As shown in FIG. 26, the planet gear 93 is pivotably mounted above the annular seat 16 through the planet gear shaft 92. The planet gear shaft 92 is mounted on the bottom portion of the driving nut 15. The driving nut is rotatablely mounted on the body 1. And the antifriction member 108, i.e., antifriction bearing, is mounted between the driving nut 15 and the body 1.

Figure 34:
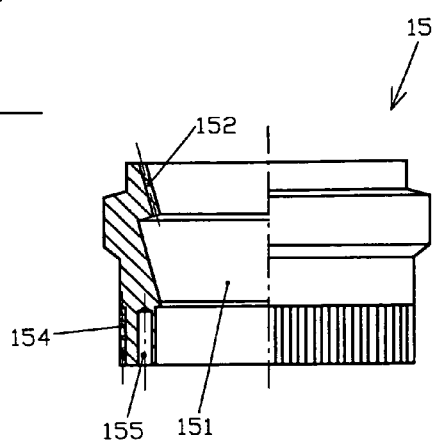
FIG. 34 is a front sectional view of a driving nut (15)

FIG. 34 is the front sectional view of the driving nut 15. As shown in FIG. 34, the driving nut 15 is provided with the through hole 151 in the central portion. On the top portion of the driving nut 15 formed the rabbet 153, used for mounting the bearing 12 between the driving nut 15 and the support stand 104 of the body 1. For the driving nut 15, its inner surface has female thread 152 used for engaging with the male thread 302 of the rear end of the jaw 3, its bottom portion of the outer surface is circumferentially and equally provided with the ratchet 154, and its bottom is provided with pin hole 155.

As shown in FIG. 27, the control portion 146 extends downwardly to the space between the pawl seat portion of the annular seat 16 and the ratchet member portion 81 of the annular sleeve 8 and is located in the control recess 163 in the circumferential direction. The pawl member 71 and the disengaging-assistance resilient member 72 are mounted in the accommodating space between the inner surface of the annular seat 16 and the driving nut 15.

During the operation of clamping, the control outer sleeve 4 is rotated along the first direction, leading the control portion 146 rotating along the first direction (the counter clockwise direction in FIG. 27) in the control recess 163 relatively to the nut, to reach the projection portion 164 on the left side in FIG. 27. During said process, the control portion 146 presses down the first projection 712 and the second projection 722 through the first slope 713 and the second slope 723 respectively. The resilient member 7 is deformed resulting in the pawl 711 biased on the ratchet 154 which is located on the bottom portion of the driving nut 15. The pressurization of the exerting portion 721, toward the pawl 711, further ensures the reliability of the engagement between the pawl 711 and the ratchet 154.

During the operation of releasing, the control outer sleeve 4 is rotated along the second direction, leading the control portion 146 rotating along the second direction (i.e., the clockwise direction in FIG. 27) in the control recess 163 relative to the nut, to reach the projection portion 164 on the right side in FIG. 27. During said process, the control portion 146 slides along the first slope 713 and the second slope 723 through the first projection 712 and the second projection 722. Because of the resilient restoring force, the first slope 713 and the second slope 723 exert forces onto the control portion 146. The component force of said forces in the circumferential direction drives the control portion 146 continuously rotating until reaching the releasing position. Simultaneously, with the combined effect of moving outwardly of the exerting portion 721 of the disengaging-assistance resilient member 72 and the inherent elastic restoring force of the pawl member 71, the pawl 711 is able to disengaging smoothly from the ratchet and the pawl 711 is incapable of sliding on the crest of the ratchet 154. Consequently, the phenomenon of "teeth scraping" is avoided effectively.

The Fourth Embodiment

Figure 35:
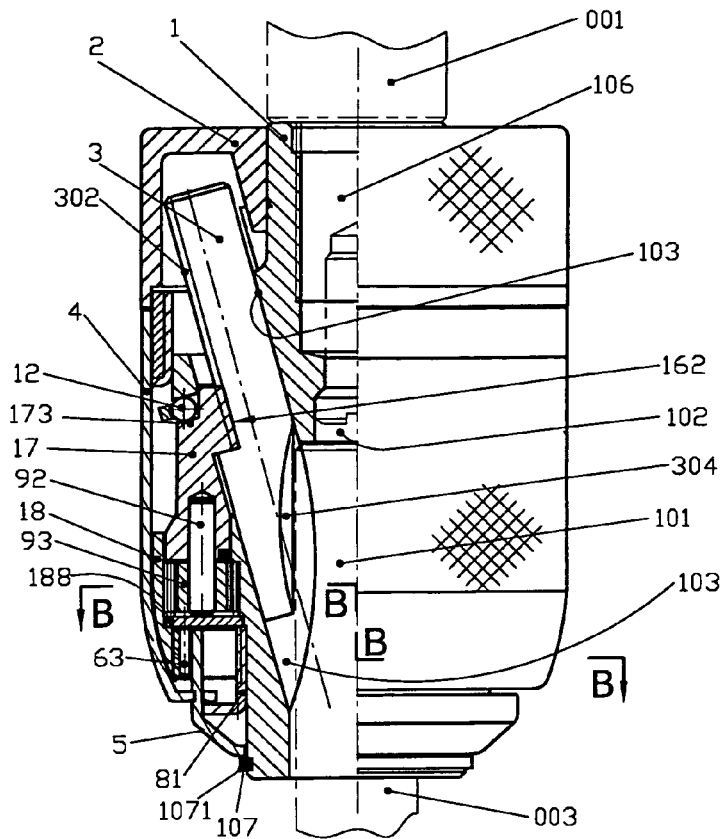
FIG. 35 is a front sectional view of the clamping structure according to the third embodiment of the present invention.
Figure 36:
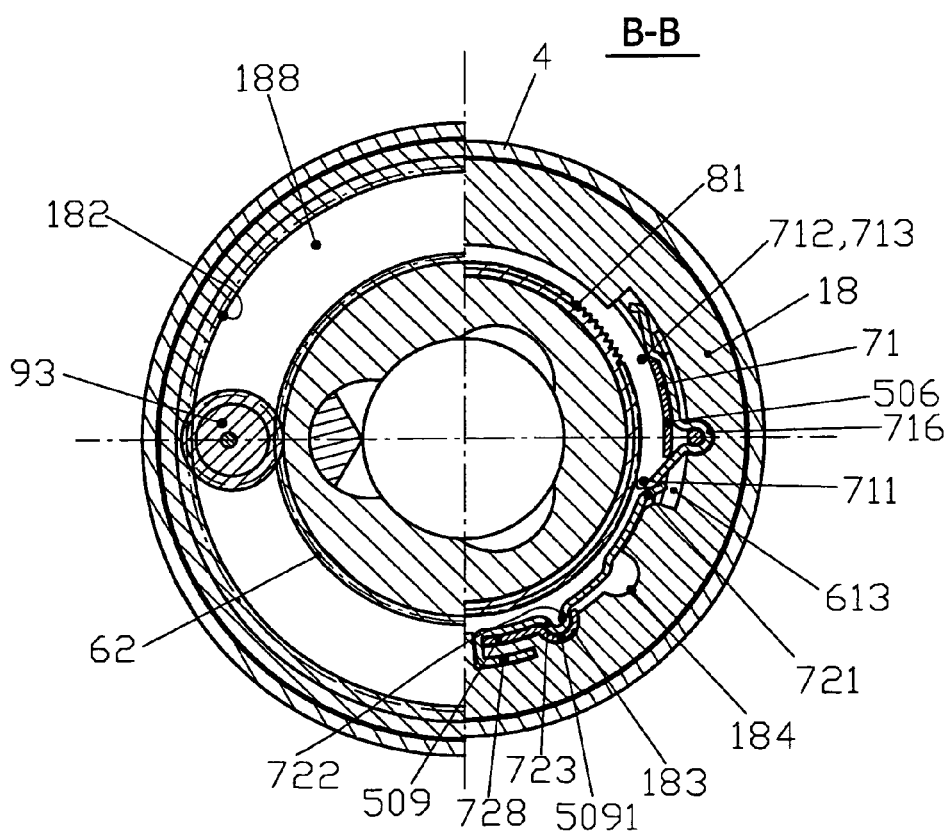
FIG. 36 is a sectional structure schematic view taken along position B-B in FIG. 35.

FIG. 35 is the front sectional view of the clamping structure in accordance to the fourth embodiment of the present invention and FIG. 36 is the configuration diagram intercepted along the line B-B in the FIG. 35. Referring FIG. 35, the annular seat 18 is mounted on the inner surface of the control outer sleeve 4.

Figure 37:
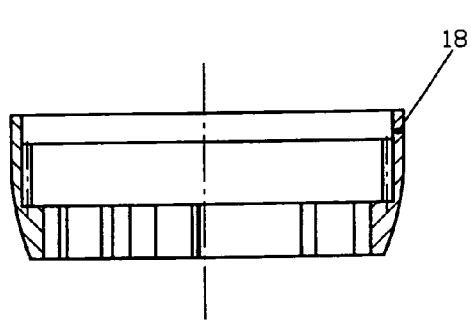
FIGS. 37 and 38 are a front sectional view and a top view of a ring seat (18)
Figure 38:
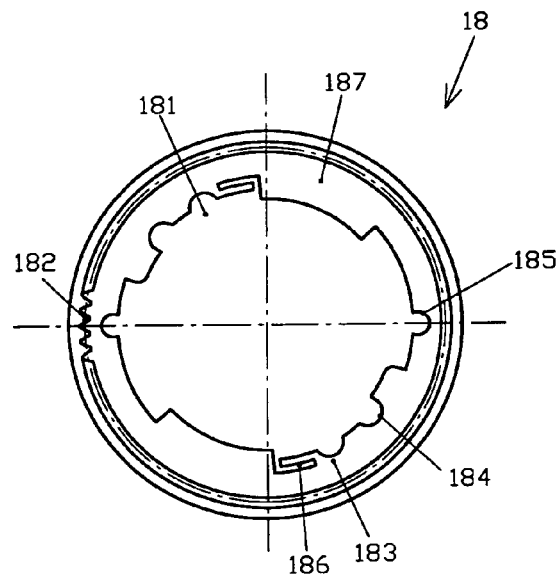

FIG. 37 and FIG. 38 are the front sectional view and the top view of the annular seat 18 respectively. Referring to FIG. 37 and FIG. 38, the annular seat 18 is provided with the through hole 181 in the central portion and the inner teeth 182 on the inner surface of the sidewall, therefore the sidewall serves the same function as the inner gear ring. The bottom portion of the annular seat 18 extends inwardly to form the horizontal extending portion 187, whose inner circumference is provided with pivot opening 185, releasing positioning recess 183 and clamping positioning recess 184. The pivot opening 185, used for mounting the pivot portion 716 of the pawl member 71, is opening inwardly in the radial direction. The inner wall of the pivot opening 185 extends circumferentially exceeding 180 degrees and matches to the outer circumference of the pivot portion 716 of the pawl member 71. Consequently, the pivot portion 716 is pivotably positioned in said pivot opening 185. The horizontal extending portion 187 has the same function as the pawl seat and the annular seat 18 may be regarded as an integration of the inner gear ring and the pawl seat.

Preferably, the pin 63 is wedged in the pivot portion 716 of the pawl member 71, such that said pivot portion 716 is able to keep in matching to the circular inner wall of the said pivot opening. Thereby the length of the pin 63 may be smaller than or equal to the width of the pawl member 71. It is unnecessary for the pin 63 to extend out from the pivot portion 716 in both directions or make the radial fixation with any kind of configuration at both ends. As shown in FIG. 35, the washer 188 is mounted above the horizontal extending portion 187 to support the above planet gear 93. Similarly, another washer may be mounted below the horizontal extending portion 187 (not shown) to support the pawl member 71 and the pin 63 in the pivot opening 185.

Figure 39:
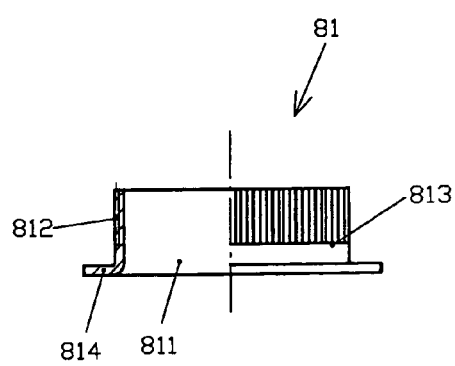
FIG. 39 is a front sectional view of a ratchet member 81.

Correspondingly to the pawl member 71, the body 1 is fixedly provided with the ratchet member 81. FIG. 39 is the front sectional view of the pawl member 81. As shown in FIG. 39, the pawl member 81 comprises the sidewall and the bottom wall, and is provided with the through hole 811 in the central portion. The sidewall is arranged with a plurality of ratchets 812 and the bottom wall is arranged with the flange 814 outwardly extending in the radial direction.

As shown in FIG. 35, the planet gear 93 is pivotally mounted through the planet gear shaft 92. The planet gear shaft 92 is mounted on the bottom portion of the driving nut 17. The driving nut 71 is pivotally mounted on the body 1.

Figure 40:
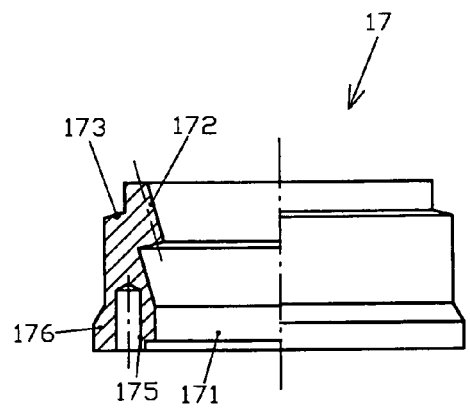
FIG. 40 is a front sectional view of a driving nut 17.
Figure 41:
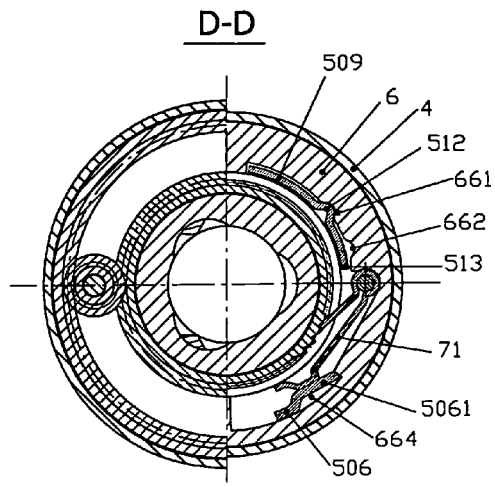
FIG. 41 is a sectional view taken along the section of D-D in FIG. 1 according to the fifth embodiment of the present invention, wherein the one-way clutch is in an engagement state.
Figure 42:
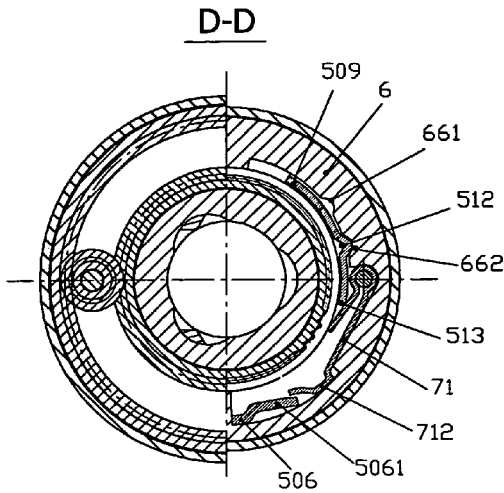
FIG. 42 is a sectional view taken along the section of D-D in FIG. 1 according to the fifth embodiment of the present invention, wherein the one-way clutch is in a disengagement state.

FIG. 40 is the front sectional view of the driving nut 17. As shown in FIG. 17, the driving nut 17 is provided with the through hole 171 in the central portion. The rabbet 173 is formed on the top portion of the driving nut 71 for mounting the bearing 12 between the driving nut 17 and the support stand 104 of the body 1. For the driving nut 17, the inner surface has the female thread 172 for matching to the male thread 302 of the rear end of the jaw 3 and the bottom portion is provided with the pin hole 175.

The clamping structure in FIG. 35 and FIG. 36 adopts the one-way clutch of a different kind. The difference, between this clutch and that adopted in the foregoing clamping structure, is that the disengaging-assistance resilient member 72 is circumferentially arranged in the side of the second direction to the pawl member 71 and the exerting portion 721 of the disengaging-assistance resilient member is located on the outer side of the pawl 711 of the pawl member 71. The front cover 5 (i.e., the control member) of the clamping structure adopts the similar structure as that shown in FIG. 23 and FIG. 24 except that it should be noticed that the end portion of the second control portion 509 is provided with the raised rib 5091 which is a cambered and outward projection.

Referring to FIG. 36 again, the second control portion extends upwardly to the space between the disengaging-assistance resilient member 72 and the inner surface of the horizontal extending portion 187 of the annular seat 18. And when rotating the control outer sleeve 4, the control portion 506 of the control recess 613 is rotating synchronically between the releasing positioning recess 183 and the clamping positioning recess 184.

As shown in FIG. 36, the clamping structure is under the releasing condition. During the process of releasing, because the first slope 713 of the pawl member 71 and the second slope 723 of the disengaging-assistance resilient member 72 can exert forces to the control portion 506 and the second control portion 509 respectively, of which the circumferential component force along the second direction makes the control portion 506 continuously rotating along the second direction until reaching the releasing position. Simultaneously, with the combined effect of the outwardly moving of the exerting portion 721 of the disengaging-assistance resilient member 72 and the inherent elastic restoring force of the pawl member 71, the pawl 711 can disengage smoothly from the ratchets and is incapable of sliding on the crest (top) of the ratchets 812. Consequently, the phenomenon of "teeth scraping" can be avoided effectively.

The Fifth Embodiment

FIG. 41 to FIG. 46 are the configuration diagrams in accordance to the fifth embodiment of the present invention. The front view is the same as FIG. 1 of the first embodiment so not given again herein.

Figure 43:
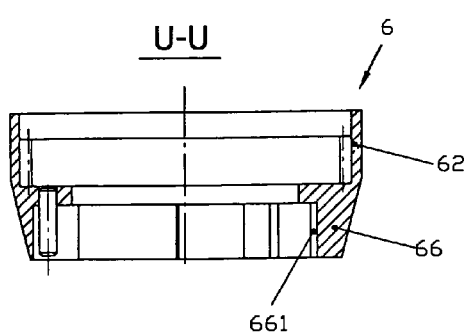
FIG. 43 is a front sectional view of a ring seat (6) taken along the section of U-U in FIG. 44 in the clamping structure according to the five embodiment of the present invention.
Figure 45:
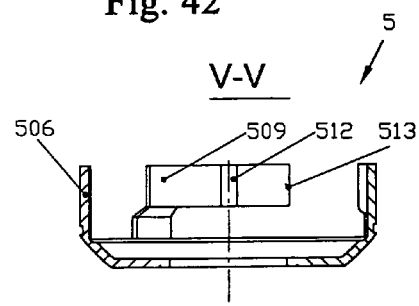
FIG. 45 is a front sectional view of another front cover (5) with different structure taken along position V-V in FIG. 46.
Figure 44:
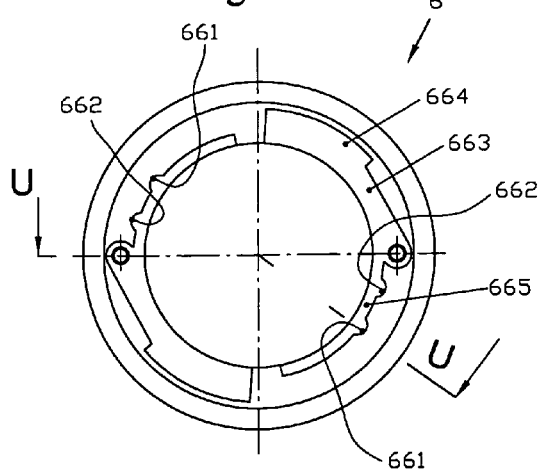
FIG. 44 is a bottom view of the ring seat (6)
Figure 46:
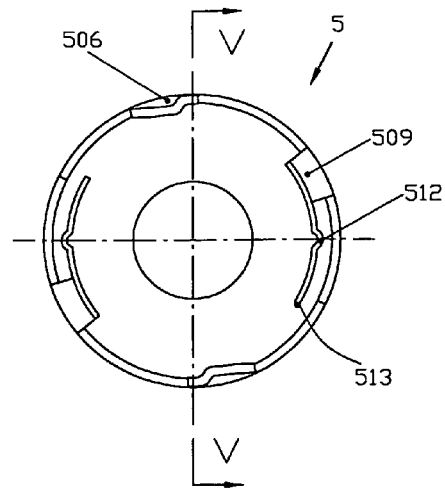
FIG. 46 is a top view of the front cover (5)
Figure 47:
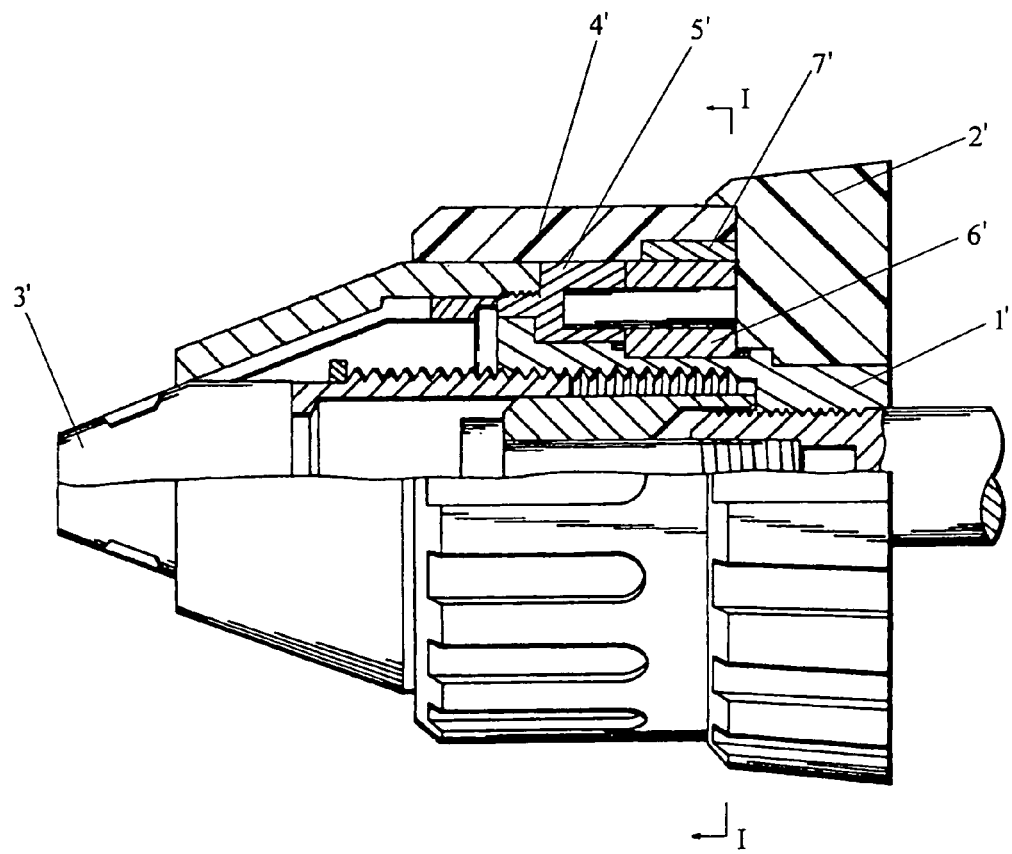
FIG. 47 is a longitudinal partial-sectional front view of a clamping structure in prior art.
Figure 48:
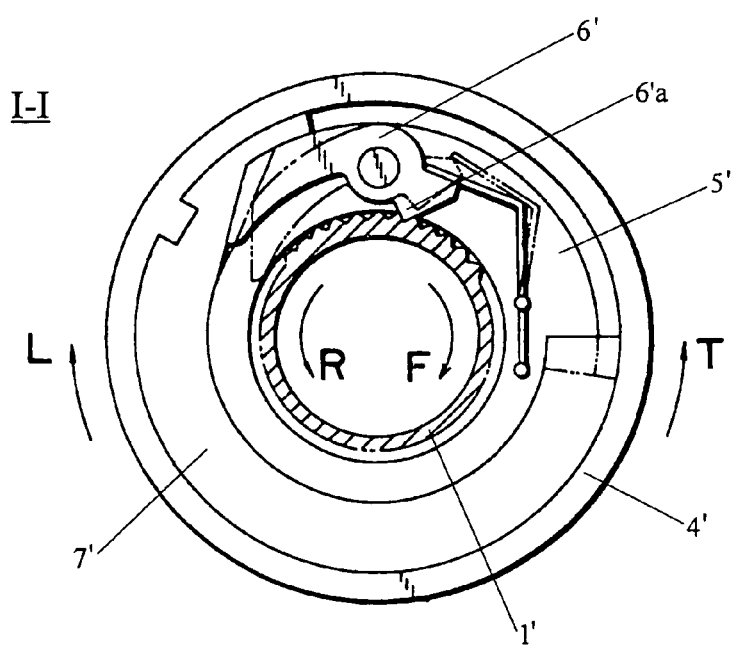
FIG. 48 is a cross sectional view of the clamping structure in FIG. 47.

The annular seat 6 is mounted on the inner side of the control outer sleeve 4 and on its outer surface provided with the profile matching to the inner surface of control outer sleeve 4. FIG. 43 is the front sectional view of the annular seat 6 taken along the section U-U in FIG. 44. The annular seat, similar with that shown in FIG. 13 and FIG. 14, comprises the pawl seat portion 66 located on the bottom portion and the inner gear ring portion 62 located on the top portion. The inner wall of the pawl seat portion 66 has the pawl mounting recess 663 used for accommodating the pawl member 71. The pawl mounting recess 663 is provided with the control recess 664 as well, used for accommodating the control portion 506 of the front cover 5. In addition, a disengaging-assistance recess 665, connected with the pawl mounting recess 663 and arranged along the inner surface of the pawl seat portion 66, is in transfixion with the pawl mounting recess 663 and provided with the releasing positioning groove 662 and clamping positioning groove 661, wherein both grooves are cambered.

The front cover 5 has the control portion 506 and the second control portion 509, both spaced apart. From FIG. 41 and FIG. 42, it can be seen that a projection is on one side of the control portion 506 and used for engaging with the projection 712 of the pawl member 71. The second control portion 509 extends in the circumferential direction to form the elasticity arm. The middle portion of the elasticity arm has a projection as a longitudinal raised rib 512 and the exerting portion 513. The elasticity arm can carry on the function of disengaging-assistance and the raised rib 512 is arranged with cambered surface.

While it is required to clamp the tool handle, the control outer sleeve 4 is rotated along the first direction. The control portion 506 of the front cover 5 moves forwardly along the first direction in the control recess 664 and presses against the pawl member 71 resulting in the pawl of the pawl member at the free end (the pawl arm) engaging with the ratchet of the ratchet member portion 82 located at the center (referring to FIG. 1 and FIG. 18). Simultaneously, the elasticity arm of the second control portion 509, moving from the releasing positioning groove 662 to clamping positioning groove 661, is deformed between the 2 grooves resulting in approximately shifting inwardly along the radial direction, consequently the engagement between the pawl and the ratchet is not affected. After reaching the clamping end of the control recess 664, the control portion 506 pushes the annular seat 6 to start the clamping process through the extrusion with the clamping end. Here, the raised rib of the elasticity arm on the second control portion 509 is positioned in the clamping positioning groove to keep the projection 5061 of the control portion 506 being pressed against the projection of the pawl member 71 and the pawl being biased on the ratchet. Further, it is ensured that the pawl is in engagement with the ratchet all along after clamping.

When it is required to release the tool handle, the control outer sleeve 4 is rotated along the second direction, leading the front cover 5 rotating along the second direction. The raised rib 512 of the elasticity arm, extended along the second direction from the second control portion 509 of the front cover 5, is deformed when moving to the space between the releasing positioning groove 662 and the clamping positioning groove 661 on the annular seat 6. Here, the control portion 506 is at the position of pressing the projection 712 of the pawl member 71. During continuously rotating of the outer sleeve, when the control portion 506 is about to disengaging from the tail end circumference of the projection of the control arm of the pawl member 71, the raised rib 512 of the elasticity arm of the second control portion 509 is exactly located on the circumference of the releasing positioning groove 662 of the annular seat 6. At this time, any slightly rotation (disturbance) will conduce the control member 5 continuously rotating with the combined effect of the elasticity counter force exerting to the raised rib 512 of the elasticity arm and the elasticity force that the tail end circumference of the projection of the pawl member 71 exerts to the control portion 506. Such that the raised rib 512 slides into the groove 662 and the control portion 506 releases the pressure on the projection of the control arm of the pawl member 71. Simultaneously, the free end (i.e., the exerting portion 513) of the elasticity arm will uplift the pawl arm of the pawl member 71 along with the restoration of the elasticity deformation of the elasticity arm, which results in the fully disengagement between the pawl and the ratchet.

Although both the positioning grooves 662 and 663 and the raised rib have the cambered surfaces, it is known that the same object of the invention can be achieved by replacing the cambered surface with other kind of surfaces, e.g., inclined plane.

Though the preferred embodiments of the present invention have been disclosed for more clearly describing the present invention, those skilled in the art may understand that there are a variety of variations and modifications for the present invention. For example, in the embodiments of the present invention, each clamping structure contains the 2 groups of one-way clutches in contraposition. However, in the actual implementation, it is feasible to arrange only one or more than two groups of one-way clutches. Any modification, replacement and improvement covered by the spirits and principles of the present invention will be included in the protection scope of the present invention.

The invention claimed is:

1. A one-way clutch device comprising:
a ratchet member with a plurality of ratchets around the circumference thereof;
a pawl seat provided rotatably around the exterior of the ratchet member;
a pawl member provided rotatably on the pawl seat and having a pawl which engages with the ratchets by being biased against the ratchet member, characterized in that the pawl member is a resilient member having a first projection and the first surface therein, wherein the first surface is located at the second direction side of the first projection towards the second direction and forms a side of the first projection, the pawl member comprising:
a pawl arm forming the pawl at the distal end thereof;
a mounting and controlling arm provided with the first projection and the first surface; and
pivot portion connecting between the pawl arm and the mounting and controlling arm and positioning radially the pawl member relative to the pivoting axis thereof, characterized in that the pivot portion is a circular ring structure formed by bending with a bending angle more than 180 degrees and less than 360 degrees; and
a control outer sleeve provided rotatably around the pawl seat and having an integral or separate control member connected thereto, the control member has a control portion for engaging with the pawl member such that the pawl engages with the ratchet when the control outer sleeve is rotated in a first direction to a first position and disengages from the ratchet when the control outer sleeve is rotated in a second direction to a second position;
characterized in that at least one of the control portion or the pawl member has a first surface which contacts the other one of the control portion or the pawl member such that the pawl member exerts a force towards the second direction on the control portion.

2. The one-way clutch device according to claim 1, characterized in that the pawl seat is provided with a pivot opening opened radially with a circular inner wall, wherein the circular inner wall of the pivot opening extends circumferentially exceeding 180 degrees and associates with the outer circumference of the pivot portion of the pawl member such that the pivot portion is positioned pivotally in the pivot opening.

3. The one-way clutch device according to claim 2, characterized in that a pin is mounted in the pivot opening and the pivot portion is fitted around the pin.

4. The one-way clutch device according to claim 2, characterized in that a pin is inserted in the pivot portion to maintain the pivot portion matching with circular inner wall of the pivot opening.

5. The one-way clutch device according to claim 1, characterized in that the other end of the mounting and controlling arm, which is opposite to the pivot portion, has a positioning portion, and the pawl seat is provided with a corresponding positioning stud or a corresponding recessed positioning hole to fit with the positioning portion.

6. The one-way clutch device according to claim 1, characterized in that a pawl mounting recess with a profile corresponding to that of the pawl is provided along a inner wall of the pawl seat.

7. The one-way clutch device according to claim 1, characterized in that the control member is mounted at the front end of the control outer sleeve with the control portion thereof extending rearward; and the pawl seat is located at the rear side of the control member.

8. The one-way clutch device according to claim 1, characterized in that the control member is mounted at the inner surface of control outer sleeve with the control portion thereof extending forward; and the pawl seat is located at the front side of the control member.

9. The one-way clutch device according to claim 1, characterized in that the control outer sleeve is formed integrally with the control member.

10. The one-way clutch device according to claim 1, characterized in that the control member is further provided with a second control portion which extends in the second direction and forms a resilient arm having a projection, and the pawl seat has a releasing positioning slot and a clamping positioning slot, so that the projection fits in the releasing positioning slot and the clamping positioning slot when being in the releasing position and the clamping position, respectively, and the free end of the resilient arm forms an exerting portion to engage with the pawl member and contribute the pawl member to disengage from the ratchet.

11. The one-way clutch device according to claim 1, characterized in that the first surface may be a flat surface or a cambered surface.

12. A one-way clutch device comprising:
   a ratchet member with a plurality of ratchets around the circumference thereof;
   a pawl seat provided rotatably around the exterior of the ratchet member;
   a pawl member provided rotatably on the pawl seat and having a pawl which engages with the ratchets by being biased against the ratchet member, characterized in that the pawl member is a resilient member having a first projection and the first surface therein, wherein the first surface is located at the second direction side of the first projection towards the second direction and forms a side of the first projection; and
   a control outer sleeve provided rotatable around the pawl seat and having an integral or separate control member connected thereto, the control member has a control portion for engaging with the pawl member such that the pawl engages with the ratchet when the control outer sleeve is rotated in a first direction to a first position and disengages from the ratchet when the control outer sleeve is rotated in a second direction to a second position;
   characterized in that at least one of the control portion or the pawl member has a first surface which contacts the other one of the control portion or the pawl member such that the pawl member exerts a force towards the second direction on the control portion; and further characterized in that the pawl seat is provided with a control recess for receiving the control portion so that the control portion is moveable in the control recess and the two ends of the control recess limit the control portion respectively in a clamping position and a releasing position, and the clamping position and the releasing position correspond to the first position and the second position of the control outer sleeve, respectively.

13. The one-way clutch device according to claim 12, characterized in that the control portion is provided with a raised rib that is in contact with the first projection of the pawl member when the control portion is in the clamping position.

14. The one-way clutch device according to claim 12, characterized in that the control portion is provided with a raised positioning rib, and the pawl seat is provided with two positioning slots on the inner wall thereof for receiving the raised positioning rib of the control portion so as to limit the control portion, respectively, in a clamping position and a releasing position, the clamping position and the releasing position correspond to the first position and the second position of the control outer sleeve respectively.

15. The one-way clutch device according to claim 12, characterized in that further comprising a disengagement-assisting resilient member, which is mounted on the pawl seat, to contribute the pawl of the pawl member to disengage from the ratchet of the ratchet member by engaging the control portion of the control member.

16. The one-way clutch device according to claim 15, characterized in that the disengagement-assisting resilient member has a second projection and a second surface, wherein the second surface is located at the second direction side of the second projection towards the second direction and forms a side of the second projection.

17. The one-way clutch device according to claim 16, characterized in that the disengagement-assisting resilient member is mounted longitudinally at a side of the pawl member, and the second surface thereof is an exerting portion in contact with the control portion to exert a force towards the second direction on the control portion.

18. The one-way clutch device according to claim 17, characterized in that the exerting portion of the disengagement-assisting resilient member is located at the outside of the pawl, such that when the control portion is in the clamping position, the control portion presses against the second projection to deform the disengagement-assisting resilient member, and the exerting portion of the disengagement-assisting resilient member biases the pawl of the pawl member against the ratchet of the ratchet member; and contrarily, when the control portion is in the releasing position, the disengagement-assisting resilient member returns to the original status, and the exerting portion thereof releases the biasing force to the pawl to disengage the same from the ratchet.

19. The one-way clutch device according to claim 16, characterized in that the disengagement-assisting resilient member is mounted circumferentially at a side of the pawl member, and the second surface thereof is in contact with a second control portion provided on the control member and connected fixedly to the control portion for exerting a force towards the second direction on the second control portion.

20. The one-way clutch device according to claim 19, characterized in that the exerting portion of the disengagement-assisting resilient member is located at the outside of the pawl, such that when the control portion is in the clamping position, the second control portion presses against the second projection to deform the disengagement-assisting resilient member, and the exerting portion of the disengagement-assisting resilient member biases the pawl of the pawl member against the ratchet of the ratchet member; and contrarily, when the control portion is in the releasing position, the disengagement-assisting resilient member returns to the original status, and the exerting portion thereof releases the biasing force to the pawl to disengage the same from the ratchet.

21. The one-way clutch device according to claim 19, characterized in that the exerting portion of the disengagement-assisting resilient member is located at the inside of the pawl, such that when the control portion is in the clamping position, the second control portion presses against the second projection to deform the disengagement-assisting resilient member, and the exerting portion of the disengagement-assisting resilient member moves inwards and does not bias the pawl; and contrarily, when the control portion is in the releasing position, the disengagement-assisting resilient member returns to the original status, and the exerting portion thereof biases the pawl from the inside to disengage the same from the ratchet of the ratchet member.

22. A clamping structure for a handled tool mounted to a drive shaft driven by a power source, comprising:
   a body with a longitudinal central axis, connected at its rear end to the drive shaft so that the body is driven to rotate about the central axis, having a plurality of equally spaced inclined holes;
   a plurality of jaws disposed in the inclined holes of the body, the jaws having male thread on the rear portion thereof and clamping portion on the front portion thereof, the jaws sliding forward and backward in the inclined holes through screw drive to clamp or release the tool;

a rear cap fixedly disposed at the rear end of the body and formed with a first grasping portion at its circumference;

a control outer sleeve rotatably mounted around the exterior of the body, positioned at the front of the rear cap, and formed with a second grasping portion at its outer surface; and a driving nut mounted around the body and connected to the control outer sleeve indirectly, where the driving nut can be driven by rotating the control outer sleeve and has female thread for cooperating with the male thread of the jaws in its inner surface so as to drive the jaws;

a planetary transmission mechanism disposed between the pawl seat and the driving nut and comprising:

an outer gear ring fixedly connected to the body;

an inner gear ring fixedly connected to the pawl seat;

a planet carrier rotatably mounted around the body, connected with the driving nut, and provided with a planet gear shaft; and a planet gear rotatably mounted on the planet gear shaft, located between the outer gear ring and the inner gear ring, and engaging with both the inner gear ring and the outer gear ring; and a one-way clutch device having:

a ratchet member with a plurality of ratchets around the circumference thereof;

a pawl seat provided rotatably around the exterior of the ratchet member;

a pawl member provided rotatably on the pawl seat and having a pawl which engages with the ratchets by being biased against the ratchet member; and a control outer sleeve provided rotatable around the pawl seat and having an integral or separate control member connected thereto the control member has a control portion for engaging with the pawl member such that the pawl engages with the ratchet when the control outer sleeve is rotated in a first direction to a first position and disengages from the ratchet when the control outer sleeve is rotated in a second direction to a second position;

characterized in that at least one of the control portion or the pawl member has a first surface which contacts the other one of the control portion or the pawl member such that the pawl member exerts a force towards the second direction on the control portion, and wherein the control outer sleeve of the clamping structure forms the control outer sleeve of the one-way clutch.

23. The clamping structure according to claim 22, characterized in that the ratchet member is formed integrally with the body.

24. The clamping structure according to claim 22, characterized in that the outer gear ring and the body are formed integrally.

25. The clamping structure according to claim 22, characterized in that the outer gear ring and the ratchet member are formed integrally.

26. The clamping structure according to claim 22, characterized in that the inner gear ring and the pawl seat are formed integrally.

27. The clamping structure according to claim 26, characterized in that the inner gear ring is located at the front end of the control outer sleeve, with its front end extending inward radially, and the inner gear ring is provided with an end face annular groove at the end face corresponding to the planet gear shaft; wherein the planet gear shaft extends into the end face annular groove, and is movable along the end face annular groove relative to the inner gear ring.

28. The clamping structure according to claim 27, characterized in that the body has an annular groove with a clip ring mounted therein in the front outer surface of the body and the clip ring is in contact with the front end of the outer gear ring to prevent the outer gear ring from shifting forward axially.

29. The clamping structure according to claim 22, characterized in that one of the planet carrier and the driving nut is provided with a projecting key, and the other one has a recess cooperating with the projecting key.

30. The clamping structure according to claim 22, characterized in that the planet carrier and the driving nut are connected through spline.

31. The clamping structure according to claim 22, characterized in that the control outer sleeve extends inward circumferentially at the front end thereof to form a positioning key and a connecting notch, and the connecting notch forms a flange at the bottom thereof; the control member forms a front cover at the front end of the control outer sleeve, the front cover extends rearward at the circumference thereof and forms corresponding positioning notch and connecting key, and the connecting key forms groove at the outer surface thereof, the flange matches with the groove such that the control outer sleeve and the front cover are connected together.

32. The clamping structure according to claim 31, characterized in that the front cover has a rabbet facing the rear end in the inner surface, the positioning key at the front end of the control outer sleeve extends inward beyond the rabbet and spaces properly from the end face of the rabbet axially, and a support ring is positioned in the rabbet such that the support ring cannot move axially relative to the control outer sleeve and the front cover.

33. The clamping structure according to claim 32, characterized in that the body has an annular groove with a clip ring mounted therein in the front outer surface of the body and the clip ring is in contact with the support ring to prevent the support ring from shifting forward axially.

34. The clamping structure according to claim 22, characterized in that an antifriction bearing is disposed between the planet carrier and the body.

35. The clamping structure according to claim 22, characterized in that the ratchet member of the one-way clutch and the planet carrier are fixedly provided at the driving nut, and the outer gear ring is fixedly provided at the body.

36. The clamping structure according to claim 35, characterized in that the ratchet member of the one-way clutch and the planet carrier and the driving nut are formed integrally, and the outer gear ring and the body are formed integrally.

* * * * *

UNITED STATES PATENT AND TRADEMARK OFFICE
CERTIFICATE OF CORRECTION

PATENT NO. : 7,972,093 B2
APPLICATION NO. : 11/528910
DATED : July 5, 2011
INVENTOR(S) : Guijie Li Page 1 of 3

It is certified that error appears in the above-identified patent and that said Letters Patent is hereby corrected as shown below:

IN THE SPECIFICATIONS:

Column 1, line 56:

Now reads: "is mounted rotatablely"

Should read: -- is mounted rotatably --

Column 1, line 62:

Now reads: "the pawl 6' a at"

Should read: -- the pawl 6' at --

Column 3, line 6:

Now reads: "of the pawl seat"

Should read: -- of the pawl seat. --

Column 3, line 35:

Now reads: "second projection"

Should read: -- second projection. --

Column 4, line 61:

Now reads: "outer sleeve rotatablely"

Should read: -- outer sleeve rotatably --

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 7,972,093 B2

Column 5, line 9:

Now reads:     "carrier rotatablely"

Should read:   -- carrier rotatably --

Column 5, line 11:

Now reads:     "gear rotatablely"

Should read:   -- gear rotatably --

Column 6, line 21:

Now reads:     "nut and the jaws and the jaws is"

Should read:   -- nut and the jaws and the jaws are --

Column 7, line 43:

Now reads:     "to the five embodiment"

Should read:   -- to the fifth embodiment --

Column 8, line 36:

Now reads:     "and rotatablely mounted"

Should read:   -- and rotatably mounted --

Column 10, line 23:

Now reads:     "larger than and equal to"

Should read:   -- larger than or equal to --

Column 11, line 13:

Now reads:     "may cooperates with"

Should read:   -- may cooperate with --

Column 14, line 52:

Now reads:     "avoid effectively."

Should read:   -- avoided effectively. --

Column 15, line 60:

Now reads:     "nut is rotatablely"

Should read:   -- nut is rotatably --

Column 16, line 46:

Now reads:     "able to disengaging smoothly"

Should read:     -- able to disengage smoothly --

Column 17, line 37:

Now reads:     "The driving nut 71"

Should read:     -- The driving nut 17 --

Column 17, line 41:

Now reads:     "driving nut 71 for"

Should read:     -- driving nut 17 for --

Column 19, line 19:

Now reads:     "about to disengaging"

Should read:     -- about to disengage --

Column 19, line 20:

Now reads:     "any slightly"

Should read:     -- any slight --

Column 19, line 36:

Now reads:     "in the fully disengagement"

Should read:     -- in the full disengagement --

IN THE CLAIMS:

Column 20, line 64:

Now reads:     "to claim 1, characterized"

Should read:     -- to claim 2, characterized --

Column 23, line 36:

Now reads:     "provided rotatable around"

Should read:     -- provided rotatably around --